United States Patent
Ito et al.

(10) Patent No.: US 10,051,222 B2
(45) Date of Patent: Aug. 14, 2018

(54) SOLID-STATE IMAGING DEVICE AND CAMERA SYSTEM HAVING LOWER POWER CONSUMPTION

(71) Applicant: SONY CORPORATION, Tokyo (JP)

(72) Inventors: Masamichi Ito, Tokyo (JP); Tsuyoshi Hara, Kanagawa (JP); Yoshiaki Inada, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 15/612,930

(22) Filed: Jun. 2, 2017

(65) Prior Publication Data

US 2017/0272679 A1    Sep. 21, 2017

Related U.S. Application Data

(63) Continuation of application No. 15/140,196, filed on Apr. 27, 2016, now Pat. No. 9,699,397, which is a (Continued)

(30) Foreign Application Priority Data

Jun. 3, 2011  (JP) ................................ 2011-125708

(51) Int. Cl.
*H04N 5/3745* (2011.01)
*H04N 5/341* (2011.01)
(Continued)

(52) U.S. Cl.
CPC ......... *H04N 5/37455* (2013.01); *H04N 5/341* (2013.01); *H04N 5/347* (2013.01);
(Continued)

(58) Field of Classification Search
CPC .. H04N 5/37455; H04N 5/341; H04N 5/3456; H04N 5/347; H04N 5/357;
(Continued)

(56) References Cited

U.S. PATENT DOCUMENTS

| 2012/0133808 | A1* | 5/2012 | Park | G01J 1/46 |
| | | | | 348/294 |
| 2015/0237279 | A1* | 8/2015 | Wakano | H04N 5/3575 |
| | | | | 348/311 |
| 2017/0041517 | A1* | 2/2017 | Ikeda | H04N 5/2253 |

FOREIGN PATENT DOCUMENTS

| JP | 2005-348040 | 12/2005 |
| JP | 2009-124550 | 6/2009 |
| KR | 10-2009-0019743 | 2/2009 |

OTHER PUBLICATIONS

Official Action (with English translation) for Korean Patent Application No. 10-2017-0027561 dated Dec. 13, 2017, 9 pages.

* cited by examiner

*Primary Examiner* — Tuan Ho
(74) *Attorney, Agent, or Firm* — Sheridan Ross P.C.

(57) ABSTRACT

A solid-state imaging device includes a pixel array with unit pixels each having a photoelectric conversion device arranged in a matrix. Column signal lines are wired with respect to one column in the pixel arrangement and pixels are regularly connected to the column signal lines in accordance with rows in which pixels are positioned. A pixel signal reading unit has a column processing unit that reads pixel signals in units of plural pixels from the pixel array and performs column processing to read signals on a column basis, wherein the pixel signal reading unit includes a column input unit which can connect one or plural column signal lines arranged at a corresponding column to an input of one column processing unit through plural capacitors connected in parallel The column input unit has switches which can change a connection state between capacitors and column signal lines corresponding to the column.

20 Claims, 34 Drawing Sheets

Related U.S. Application Data continuation of application No. 14/732,349, filed on Jun. 5, 2015, now Pat. No. 9,357,146, which is a continuation of application No. 14/494,087, filed on Sep. 23, 2014, now Pat. No. 9,083,903, which is a continuation of application No. 13/474,287, filed on May 17, 2012, now Pat. No. 8,854,520.

(51) Int. Cl.
*H04N 5/357* (2011.01)
*H04N 5/378* (2011.01)
*H04N 5/374* (2011.01)
*H04N 5/345* (2011.01)
*H04N 5/376* (2011.01)
*H04N 5/347* (2011.01)

(52) U.S. Cl.
CPC .......... *H04N 5/3456* (2013.01); *H04N 5/357* (2013.01); *H04N 5/374* (2013.01); *H04N 5/378* (2013.01); *H04N 5/3741* (2013.01); *H04N 5/3745* (2013.01); *H04N 5/3765* (2013.01)

(58) Field of Classification Search
CPC .... H04N 5/374; H04N 5/3741; H04N 5/3745; H04N 5/3765; H04N 5/378
See application file for complete search history.

FIG.8

|  | VSLSW1 | VSLSW2 |
|---|---|---|
| ALL PIXELS | VSL1/VSL2 | VSL1/VSL2 |
| ONE-TO-ONE ADDITION | VSL1 | VSL2 |

FIG.12

|  | VSLSW1 | VSLSW3 | VSLSW4 | VSLSW2 |
|---|---|---|---|---|
| ALL PIXELS | VSL1/VSL2 | VSL1/VSL2 | VSL1/VSL2 | VSL1/VSL2 |
| ONE-TO-ONE ADDITION | VSL1 | VSL1 | VSL2 | VSL2 |
| ONE-TO-THREE ADDITION | VSL1 | VSL1/VSL2 | VSL1/VSL2 | VSL2 |

SOLID-STATE IMAGING DEVICE AND CAMERA SYSTEM HAVING LOWER POWER CONSUMPTION

CROSS REFERENCE TO RELATED APPLICATIONS

This is a Continuation of application Ser. No. 15/140,196, filed Apr. 27, 2016, which is a Continuation of application Ser. No. 14/732,349, filed on Jun. 5, 2015, now U.S. Pat. No. 9,357,146, issued on May 31, 2016, which is a Continuation of application Ser. No. 14/494,087, filed on Sep. 23, 2014, now U.S. Pat. No. 9,083,903, issued on Jul. 14, 2015, which is a Continuation of application Ser. No. 13/474,287, filed on May 17, 2012, now U.S. Pat. No. 8,854,520, issued on Oct. 7, 2014, which claims the benefit of Japanese Patent Application JP 2011-125708, filed in the Japan Patent Office on Jun. 3, 2011, the entire contents of which are incorporated herein by reference.

FIELD

The present disclosure relates to a solid-state imaging device and a camera system typified by a CMOS image sensor.

BACKGROUND

A CMOS image sensor can be manufactured by using the same manufacturing processes as a typical CMOS integrated circuit and can be driven with a single power source. In addition, analog circuits or logic circuits using the CMOS processes can be manufactured to coexist in a single chip.

Accordingly, the CMOS image sensor has many advantages such that the number of peripheral ICs can be reduced.

The mainstream of an output circuit of a CCD is a one-channel output type using a FD amplifier having a floating diffusing (FD) layer.

In contrast, the CMOS image sensor includes an FD amplifier for each pixel and the mainstream of the output thereof is a column-parallel output type in which a certain row is selected from a pixel array and pixels of the selected row are simultaneously read in the column direction.

This is because it is difficult to obtain the sufficient driving capability by using the FD amplifiers disposed in the pixels, it is thus necessary to reduce the data rate, and parallel processing is advantageous.

Various circuits have been proposed as a pixel signal reading (output) circuit of the column-parallel output type CMOS image sensor.

One of the most advanced types of circuits is a type in which an analog-digital converter (hereinafter, abbreviated as "ADC") is provided for each column and pixel signals are obtained as digital signals.

In recent years, high-speed property is widely declared as the directionality of development in the image sensor. On the other hand, a trend of increasing the number of pixels continues as before, and there is a need for developing a sensor in which both the high-speed performance and the increase of the number of pixels are realized.

When a frame rate is improved by skipping pixel signals for realizing high-speed performance in the sensor with a large number of pixels, the exposure amount in each pixel is reduced and the amount of signals is also reduced, therefore, reduction of S/N occurs.

As a solution for the above, the reduction of S/N is prevented by adding pixel signals to be skipped in JP-A-2005-278135 (Patent Document 1).

FIG. 1 is a diagram showing a configuration example of a CMOS image sensor as a solid-state imaging device having an addition unit of pixel signals described in Patent Document 1.

In a solid-state imaging device 10, light incident on the sensor is photoelectrically converted into electric signals by pixels PXL in a pixel array unit 11. In the pixels PXL, a row selection line 13 is selected by a row scanning circuit 12 and pixels PXL-xy are selected in the read row.

Signals for the selected one row are transferred by a vertical signal line 14 to a column processing unit 15 provided at each column.

In a comparator 15-1 inside the column processing unit 15, the signals are compared with a signal from a reference signal generation circuit (DAC) 16 generating a reference signal having a ramp waveform, and an output is inverted by time corresponding to the magnitude of the input signal. Capacitors C1 and C2 for auto-zero or CDS are connected to an input side of the comparator 15-1.

Time until the inversion is counted by a counter 15-2 to thereby generate a digital value.

Furthermore, the digital signals of the column processing unit 15 processed in respective columns by a column scanning circuit 17 are transmitted to a signal processing unit 19 by a horizontal output line 18 and outputted to an output 20 after performing addition/subtraction processing and sorting of data.

Respective operation timings of the above operations are controlled by a timing control circuit 21.

When high-speed imaging is performed in the solid-state imaging device 10, rows to be selected by the row scanning circuit 12 are selected by skipping rows, thereby reducing the data amount per frame finally transmitted to the output 20.

As the data rate at which the signal processing unit 19 performs output is limited, the frame rate can be improved by reducing the data amount.

However, the signal amount accumulated in the pixels PXL is reduced when the frame rate is improved, which lowers S/N. In particular, the reduction of sensitivity will be a problem in recent small pixels.

Accordingly, skipped pixels are added in the solid-state imaging device 10, thereby increasing the signal amount as well as preventing the lowering of S/N.

A solid-state imaging device having another configuration as the adding unit is disclosed in JP-A-2009-212621 (Patent Document 2).

FIG. 2 is a diagram showing a configuration example of a CMOS image sensor as a solid-state imaging device having the addition unit of pixel signals shown in Patent Document 2.

In a solid-state imaging device 10A, timing control is performed, in which whether a counter 15-2 is selectively reset by each column in accordance with a drive mode or not can be determined. The solid-state imaging device 10A further includes a divider so as to change a gradient of a slope having the ramp waveform of a reference signal as an output of the DAC 16.

The following addition is performed as a method of performing addition in the solid-state imaging device 10A.

When a signal from the first pixel is received by column processing units 15a and 15b via the vertical signal line 14, the solid-state imaging device 10A performs addition by counting a value of the second pixel continuously in a state of holing a value of the first pixel without resetting a counter 15-2.

In this method, the data amount horizontally transferred to the signal processing unit 19 is reduced, therefore, high-speed performance can be expected also in the reading mode in which horizontal transfer time is rate-controlled. It is also possible to change weighting on the first pixel and the second pixel by dividing a DAC clock at the time of adding pixels subsequent to the second pixel and changing the slope of the reference signal having the ramp waveform.

When the addition of pixels is simply performed, a false color may be generated as the centroid of signals is irregular according to colors, however, the false color can be suppressed by adjusting the weighting.

SUMMARY

However, in the technique disclosed in Patent Document 1, all pixels are selected, and the AD conversion in the column processing unit as well as the horizontal transfer are performed in the same manner as the operation without skipping pixels.

Accordingly, in the reading mode in which these A/D conversion time and horizontal transfer time are rate-controlled, it is difficult to realize high-speed performance.

Also in the technique disclosed in Patent Document 2, the data signal amount to be finally outputted will be the same as the amount obtained by skipping pixels, however, actual reading of pixels is performed in the same amount as the reading without skipping pixels.

That is, the number of times of AD conversion is the same in the end in the addition without skipping and in the addition with skipping. Accordingly, it is difficult to contribute to the high-speed performance even when the addition is performed in the state where the AD period is rate-controlled by the frame rate in most of current sensors.

It is therefore desirable to provide a solid-state imaging device and a camera system capable of reducing the number of times of AD conversion when reading pixel signals by adding the signals for realizing high-speed imaging and improving S/N ratio, as a result, capable of realizing low-power consumption of circuits as well as further higher imaging.

An embodiment of the present disclosure is directed to a solid-state imaging device including a pixel array unit in which unit pixels each having a photoelectric conversion device are arranged in a matrix state, plural column signal lines are wired with respect to one column in the pixel arrangement and pixels are regularly connected to the plural column signal lines in accordance with rows in which pixels are positioned, a pixel signal reading unit having a column processing unit reading pixel signals in units of plural pixels from the pixel array unit and performing column processing to read signals on a column basis, in which the pixel signal reading unit includes a column input unit which can connect one or plural column signal lines arranged at a corresponding column to an input of one column processing unit through plural capacitors connected in parallel, and the column input unit has switches which can change a connection state between plural capacitors and plural column signal lines corresponding to the column.

Another embodiment of the present disclosure is directed to a camera system including a solid-state imaging device, and an optical system forming an object image on the solid-state imaging device, in which the solid-state imaging device includes a pixel array unit in which unit pixels each having a photoelectric conversion device are arranged in a matrix state, plural column signal lines are wired with respect to one column in the pixel arrangement and pixels are regularly connected to the plural column signal lines in accordance with rows in which pixels are positioned, a pixel signal reading unit having a column processing unit reading pixel signals in units of plural pixels from the pixel array unit and performing column processing to read signals on a column basis, in which the pixel signal reading unit includes a column input unit which can connect one or plural column signal lines arranged at a corresponding column to an input of one column processing unit through plural capacitors connected in parallel, and the column input unit has switches which can change a connection state between plural capacitors and plural column signal lines corresponding to the column.

According to the embodiments of the present disclosure, it is possible to reduce the number of times of A/D conversion when reading pixel signals with addition for realizing high-speed imaging and improving S/N, as a result, lower power consumption of circuits and further higher imaging can be realized.

BRIEF DESCRIPTION OF THE DRAWINGS

FIG. 8 is a chart showing selective switching states of analog signals by the two switches at the time of reading all pixels and at the time of reading pixels with one-to-one addition in the column input unit of FIG. 7;

FIG. 12 is a chart showing selective switching states of analog signals by the four switches SW11 to SW14 at the time of reading all pixels, at the time of reading pixels with one-to-one addition and at the time of reading pixels with one-to-three addition in the column input unit of FIG. 11;

DETAILED DESCRIPTION

Hereinafter, embodiments of the present disclosure will be explained with reference to the drawings.

The explanation will be made in the following order.
1. First Embodiment (First configuration example of a solid-state imaging device)
2. Configuration Example of Column Input Unit
3. Second Embodiment (Second configuration example of the solid-state imaging device)
4. Third Embodiment (Configuration example of a camera system)

1. First Embodiment

Figure 1:
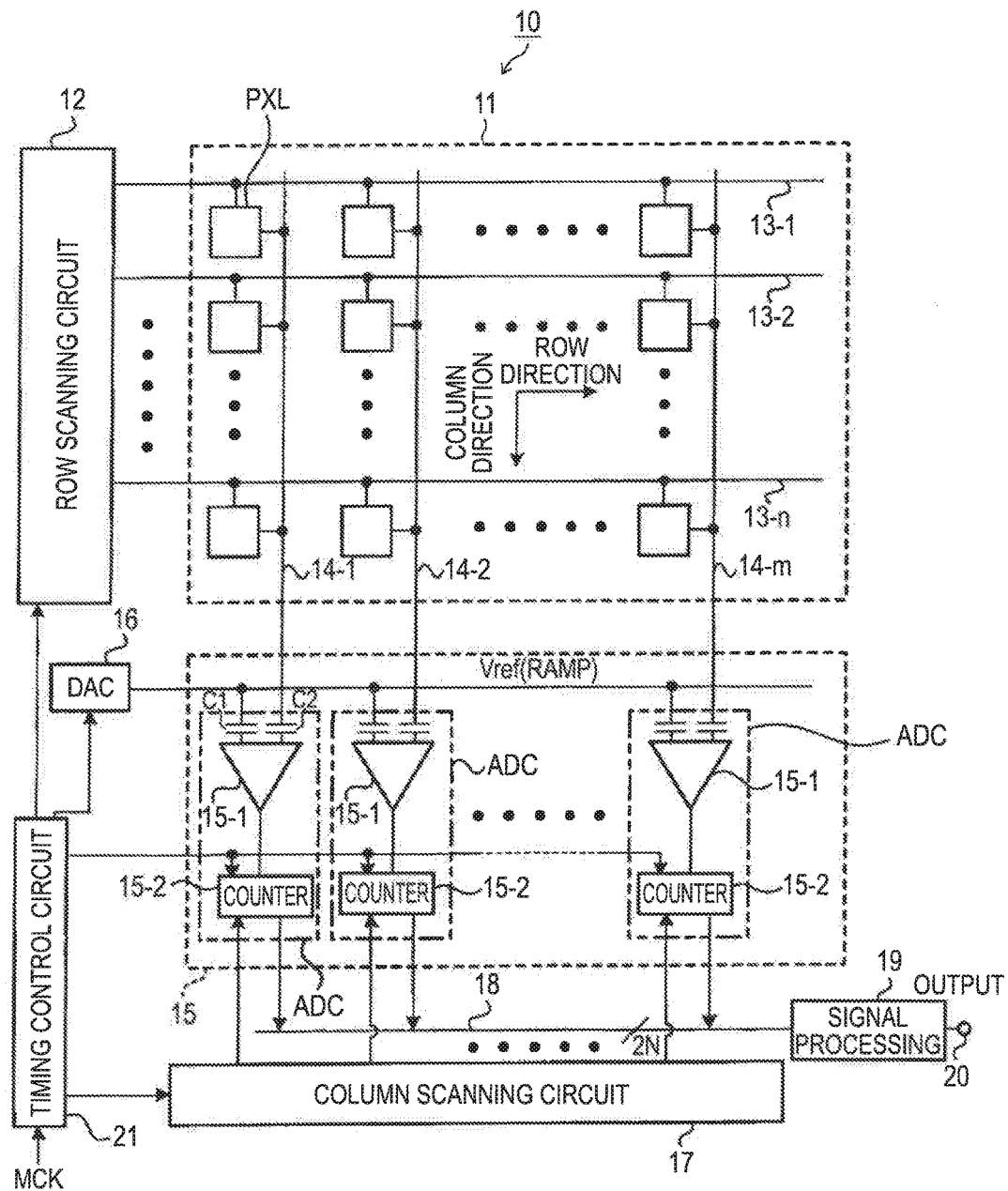
FIG. 1 is a diagram showing a configuration example of a solid-state imaging device having an addition unit of pixel signals described in Patent Document 1.
Figure 2:
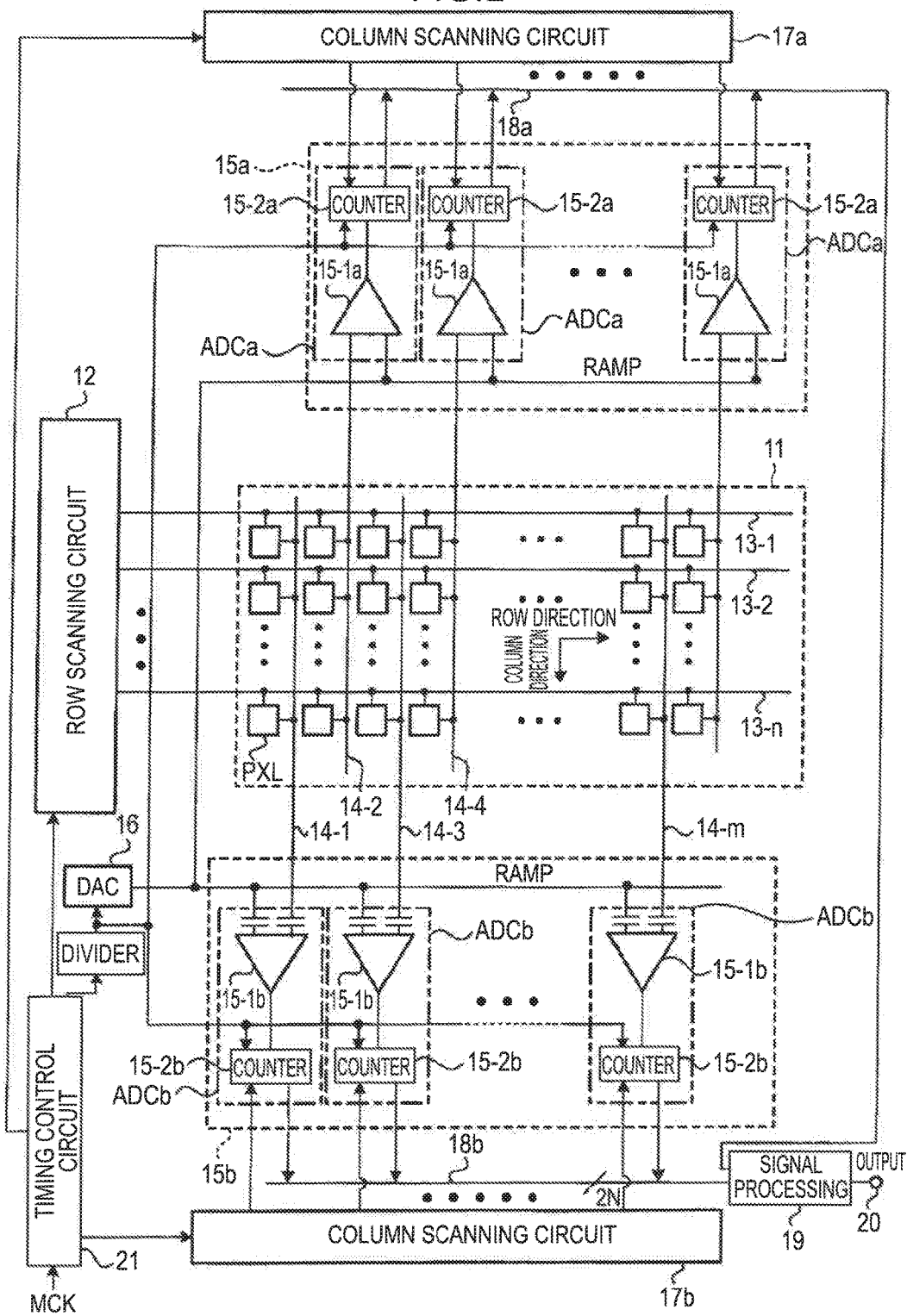
FIG. 2 is a diagram showing a configuration example of a solid-state imaging device having an addition unit of pixel signals described in Patent Document 2.
Figure 3:
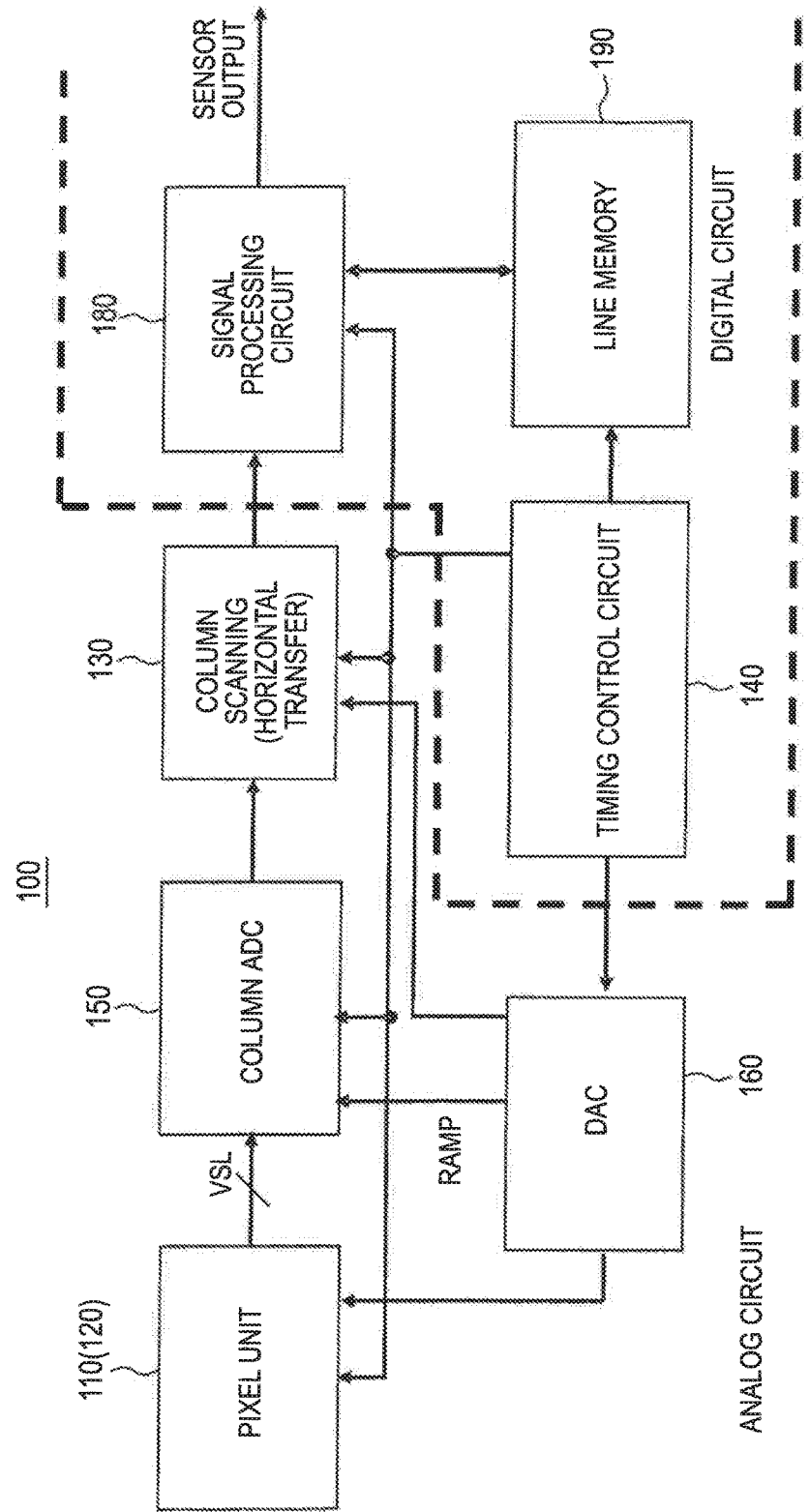
FIG. 3 is a block diagram showing a configuration example of a column-parallel ADC mounted solid-state imaging device (CMOS image sensor) according to a first embodiment.

FIG. 3 is a block diagram showing a configuration example of a column-parallel ADC mounted solid-state imaging device (CMOS image sensor) according to a first embodiment.

Figure 4:
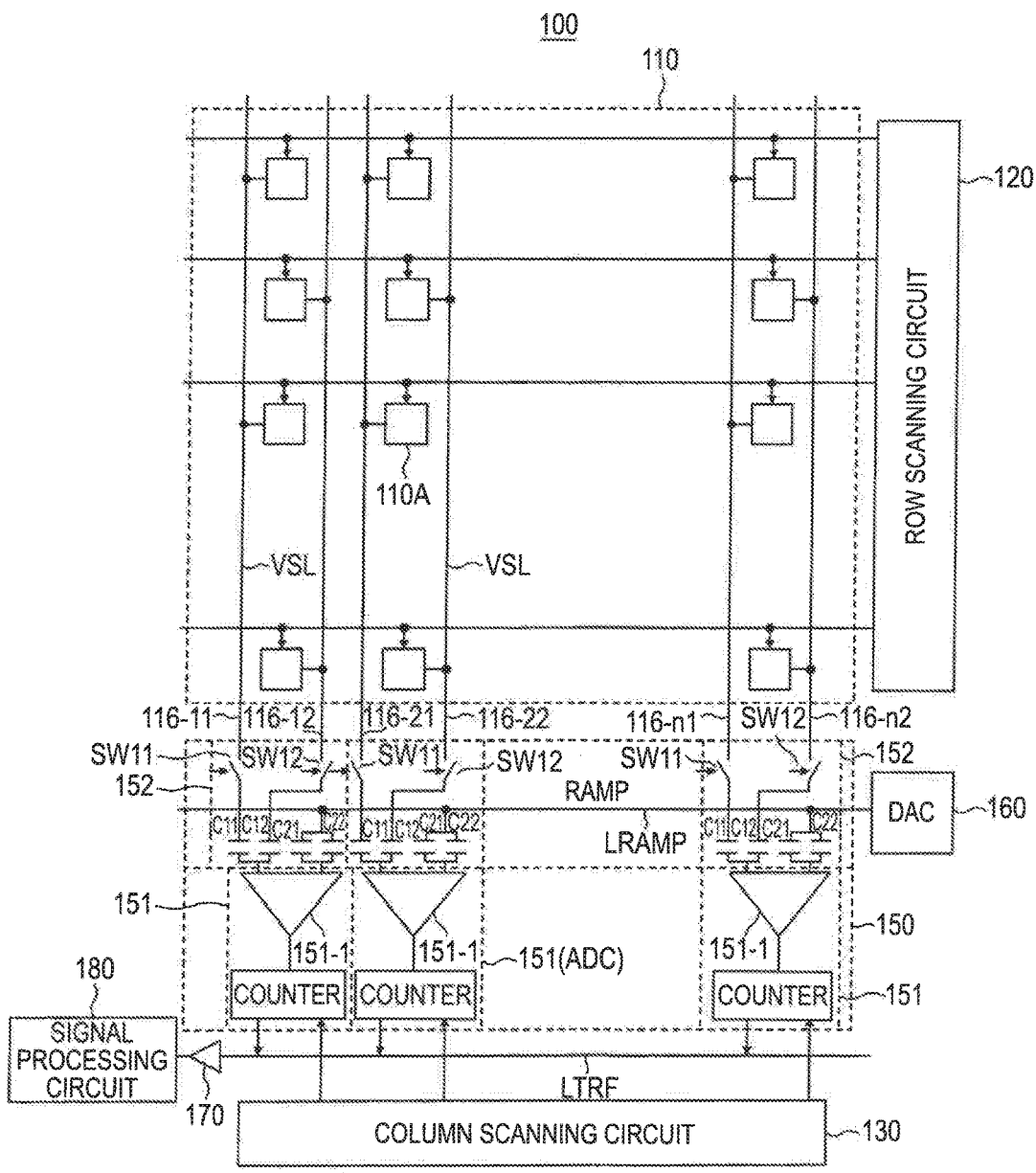
FIG. 4 is a diagram showing an ADC group more specifically in the column-parallel ADC mounted solid-state imaging device (CMOS image sensor) according to the first embodiment.

FIG. 4 is a diagram showing an ADC group and an input stage thereof more specifically in the column-parallel ADC mounted solid-state imaging device (CMOS image sensor) according to the first embodiment.

A solid-state imaging device 100 according to the embodiment includes column processing units for respective columns, each having an AD converter converting an analog signal into a digital signal and a noise cancellation unit such as CDS or auto zero (AZ), with respect to analog signals VSL read from a pixel array unit through vertical signal lines.

The solid-state imaging device 100 is also provided with switches capable of selectively cutting connection to a plural number of vertical signal lines connected through capacitors C with respect to each column processing unit.

In the solid-state imaging device 100, capacitors can double as capacitors used for AZ of CDS.

The solid-state imaging device 100 can change capacitance values of the capacitors by the switches and so on.

The solid-state imaging device 100 can also add signal values to be transmitted to the column processing unit by the capacitors.

The solid-state imaging device 100 can further perform weighting of pixel signals to be added by allowing the capacitance of the capacitors to be variable.

As described above, the solid-state imaging device 100 according to the embodiment can reduce the number of times of ADC by performing analog addition using capacitors when adding pixel signals and reading the signals for realizing high-speed imaging and improving S/N. As a result, low power consumption in circuits and further higher imaging can be realized.

The entire configuration as well as configurations of respective units of the solid-state imaging device 100, particularly, configuration examples of capacitors and switches in the input stage of a comparator in the column processing unit (ADC) will be explained.

The solid-state imaging device 100 includes a pixel array unit 110 as an imaging unit, a row (vertical) scanning circuit 120, a column (horizontal) scanning circuit 130 and a timing control circuit 140.

The solid-state imaging device 100 further includes a column processing unit group 150 as an ADC group as a pixel signal reading unit as well as a DAC (digital-analog converter) 160 generating a reference signal RAMP.

The solid-state imaging device 100 includes an amplifier circuit (S/A) 170, a signal processing circuit 180 and a line memory 190.

Among the above components, the pixel array unit 110, the row scanning circuit 120, the column scanning circuit 130, the column processing unit group (ADC group) 150, the DAC 160 and the amplifier circuit (S/A) 170 are formed by analog circuits.

The timing control circuit 140, the signal processing circuit 180 and the line memory 190 are formed by digital circuits.

In the pixel array unit 110, plural unit pixels 110A each having a photodiode (photoelectric conversion device) and an in-pixel amplifier are arranged two-dimensionally in m-rows and n-columns.

[Configuration Example of Unit Pixels]

Figure 5:
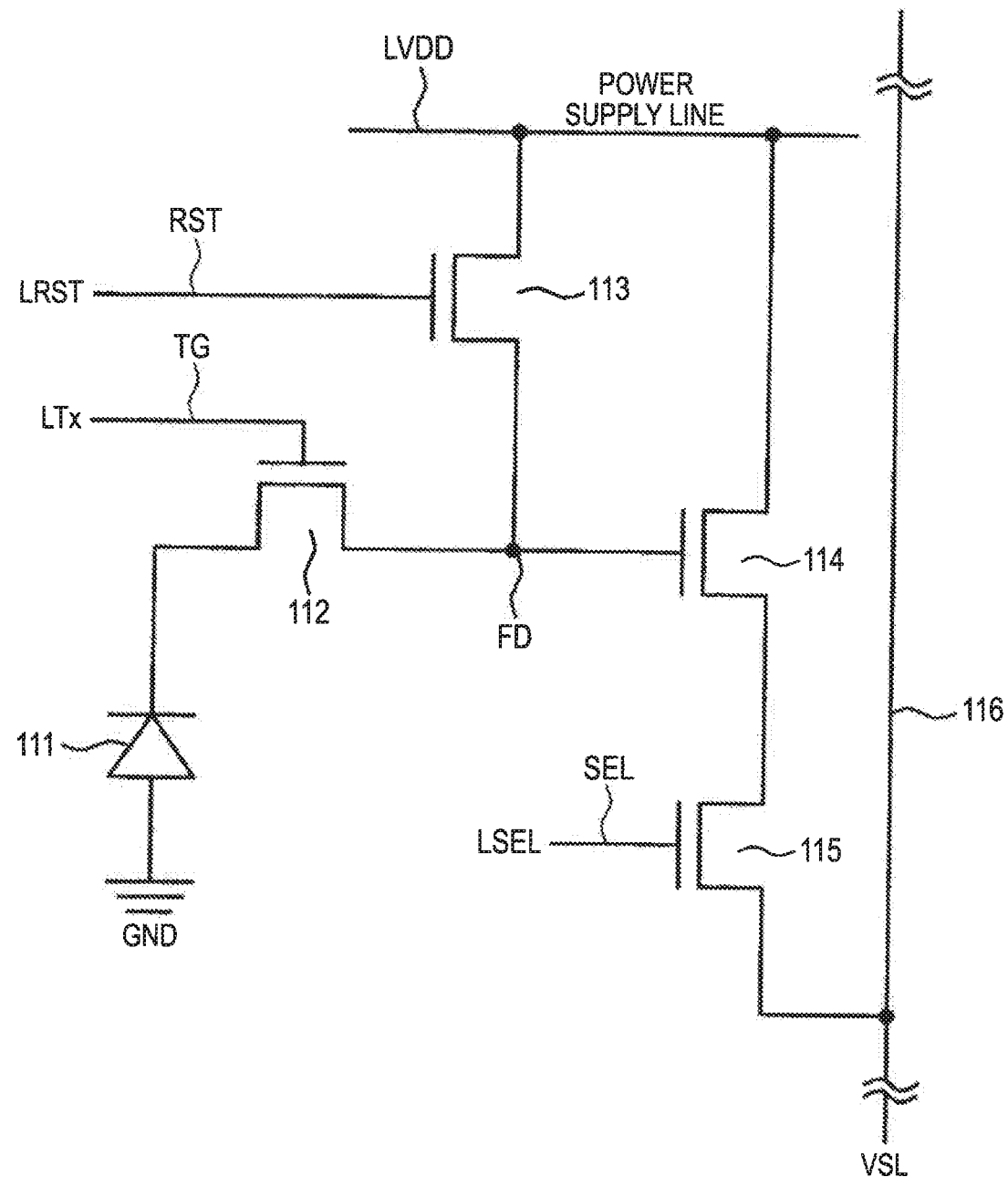
FIG. 5 is a diagram showing an example of pixels of the CMOS image sensor having four transistors according to the embodiment.

FIG. 5 is a diagram showing an example of pixels of the CMOS image sensor having four transistors according to the embodiment.

The unit pixel 110A includes a photoelectric conversion device 111 formed by, for example, a photodiode.

The unit pixel 110A includes four transistors as active devices with respect to one photoelectric conversion device 111, which are a transfer transistor 112 as a transfer device, a reset transistor 113 as a reset device, an amplification transistor 114 and a selection transistor 115.

The photoelectric conversion device 111 photoelectrically converts incident light into an amount of charges (electrons in this case) corresponding to an amount of light.

The transfer transistor 112 is connected between the photoelectric conversion device 111 and a floating diffusion FD as an output node.

The transfer transistor 112 transfers the electrons obtained by photoelectric conversion in the photoelectric conversion device 111 as a photoelectric conversion device to the floating diffusion FD when a drive signal TG is given to a gate (transfer gate) through a transfer control line LTx.

The reset transistor 113 is connected between a power supply line LVDD and the floating diffusion FD.

The reset transistor 113 resets a potential of the floating diffusion FD to a potential of the power supply line LVDD when a reset RST is given to a gate through a reset control line LRST.

A gate of the amplification transistor 114 is connected to the floating diffusion FD. The amplification transistor 114 is connected to the vertical signal line 116 through the selection transistor 115, which forms a source follower with a constant-current source at the outside of the pixel array unit.

Then, a control signal (an address signal or a selection signal) SEL is given to a gate of the selection transistor 115 through a selection control line LSEL to thereby turn on the selection transistor 115.

When the selection transistor 115 is turned on, the amplification transistor 114 amplifies the potential of the floating diffusion FD and outputs a voltage corresponding to the potential to the vertical signal line 116. The voltage outputted from each pixel through the vertical signal line 116 is outputted to the column processing unit group 150 as a pixel signal reading circuit.

These operations are simultaneously performed for respective pixels of one row in parallel as respective gates of, for example, the transfer transistor 112, the reset transistor 113 and the selection transistor 115 are connected on a row basis.

The reset control line LRST, the transfer control line LTx and the selection control line LSEL wired in the pixel array unit 110 are arranged as a group in each row in the pixel arrangement.

These reset control line LRST, the transfer control line LTx and the selection control line LSEL are driven by the row scanning circuit 120 as a pixel drive unit.

In the present embodiment, the plural vertical signal lines 116, namely, two lines are wired in the example of FIG. 4 with respect to one column processing unit.

That is, in the example of FIG. 4, vertical signal lines 116-11, 116-12 are wired in the first column and vertical signal lines 116-21, 116-22 are wired in the second column, and then, vertical signal lines 116-n, 116-n2 are wired in the n-th column in the same manner.

Then, in the example of FIG. 4, pixels 110A in odd-numbered rows are connected to the vertical signal lines 116-11, 116-21 and 116-n1 wired on the left side of respective columns in the drawing. Pixels 110A in even-numbered rows are connected to vertical signal lines 116-12, 116-22 and 116-n2 wired on the right side of respective columns in the drawing.

In the solid-state imaging device 100, the timing control circuit 140 generating an internal clock, the row scanning circuit 120 controlling row addresses or row scanning and the column scanning circuit 130 controlling column addresses and column scanning are arranged as control circuits for sequentially reading signals of the pixel array unit 110.

The timing control circuit 140 generates timing signals necessary for signal processing of the pixel array unit 110, the row scanning circuit 120, the column scanning circuit 130, the column processing unit group 150, the DAC 160, the signal processing circuit 180 and the line memory 190.

In the pixel array unit 110, video or a screen image is photoelectrically converted by each pixel row by accumulation/emission of photons using a line shutter, and analog signals VSL are outputted to respective column processing units 151 of the column processing unit group 150.

In the embodiment, column input units 152 are arranged in the input stage of respective column processing units 151 of the column processing unit group 150.

In the column input unit 152, a plural number of vertical signal lines are respectively connected through the capacitors C, and switches SW which can selectively cut the connection are provided.

The column input units 152 can reduce the number of times of column processing (AD conversion) by performing analog addition using capacitors when adding pixel signals to be read for realizing high-speed imaging or improving S/N. As a result, the solid-state imaging device 100 can realize low power consumption of the entire circuit and can perform further higher imaging.

In the column processing unit group 150, APGA correspondence integration type ADC using a reference signal (ramp signal) RAMP from the DAC 160 and a digital CDS are performed to analog output of the pixel array unit 110 in respective column processing units, thereby outputting digital signals of several bits.

[Configuration Example of the Column ADC]

Here, a basic configuration of the column ADC will be explained, then, a configuration of the column input unit 152 as a feature configuration of the embodiment will be explained.

In the column processing unit group 150 according to the embodiment, plural columns of column processing units (ADC) 151 as an ADC block are arranged.

That is, the column processing unit group 150 has a function of k-bit digital signal conversion, in which respective pairs of the vertical signal lines (column lines) 116-11, 116-12 to 116-n1, 116-n2 are arranged in respective column input units 152 and column processing units 151, which form a column-parallel ADC block.

Each column processing unit 151 includes a comparator 151-1 which compares the reference signal RAMP having a ramp waveform obtained by changing the reference signal generated by the DAC 160 into a step state with the analog signal VSL obtained via pixels of each row through the vertical signal line.

Each column processing unit 151 also has a counter latch (counter) 151-2 counting the comparison time and holding the counted results.

An output of each counter latch is connected to, for example, a horizontal transfer line LTRF with k-bit width.

K-pieces of amplifier circuits 170 corresponding to the horizontal transfer line LTRF and the signal processing circuit 180 are arranged.

In the column processing unit group 150, the analog signal potential VSL read to the vertical signal line 116 is compared with the reference signal RAMP in the comparator 151-1 arranged in each column.

At this time, the counter 151-2 arranged in each column in the same manner as the comparator 151-1 is operated.

Each column processing unit 151 converts the potential (analog signal) VSL of the vertical signal line 116 into a digital signal by changing the reference signal RAMP having the ramp waveform and a count value with one-to-one correspondence.

The column processing unit (ADC) 151 converts variation of voltage of the reference signal RAMP (voltage Vslop) into variation of time, and converts the potential into a digital value by counting the time with a certain cycle (clock).

When the analog signal VSL crosses the reference signal RAMP (Vslop), the output of the comparator 151-1 is inverted, the input clock of the counter 151-2 is stopped, or the clock the input of which has been stopped is inputted to the counter 151-2 to complete A/D conversion.

After the above A/D conversion period is completed, data held in the counter latch 151-2 is transferred to the horizontal transfer line LTRF by the column scanning circuit 130, inputted to the signal processing circuit 180 through the amplifier circuit 170, and a two-dimensional image is generated by given signal processing.

In the column scanning circuit 130, parallel transfer is performed in several channels at the same time for securing transfer speed.

The timing control circuit 140 creates timings necessary for signal processing in respective blocks such as the pixel array unit 110, the column processing unit group 150 and so on.

In the signal processing circuit 180 at the subsequent stage, correction of a vertical line defect or a point defect and clamping processing of signals are performed to signals stored in the line memory 190, further, digital signal processing such as parallel-serial conversion, compression, encoding, addition, averaging, intermittent operation is performed.

The digital signals transmitted by each row are stored in the line memory 190.

In the solid-state imaging device 100 according to the embodiment, a digital output of the signal line circuit 180 is transmitted as an input for an ISP or a baseband LSI.

<2. Configuration Example of Column Input Unit>

In the example of FIG. 4, each column input unit 152 includes first capacitors C11 and C12, second capacitors C21, C22 and switches SW11, SW12.

In the embodiment, the number of the first capacitors and the number the second capacitors are the same.

In each column input unit 152, a first terminal of the capacitor C11 and a first terminal of the capacitor C12 are connected in parallel on an input terminal side of the signal VSL of the comparator 151-1 in a corresponding column processing 151.

A second terminal of the capacitor C11 is connected to each of the vertical signal lines 116-11 to 116-$n1$ on the left side in the drawing of a corresponding column through the switch SW11.

A second terminal of the capacitor C21 is connected to each of the vertical signal lines 116-12 to 116-$n2$ on the right side in the drawing of a corresponding column through the switch SW12.

In each column input unit 152, a first terminal of the capacitor C21 and a first terminal of the capacitor C22 are connected to an input terminal side of the reference signal RAMP in the comparator 151-1.

The second terminal of the capacitor C21 and a second terminal of the capacitor C22 are connected in common to a supply line LRAMP of the reference signal RAMP.

As described above, two vertical signal lines transmitting signals from pixels are provided per one column in the embodiment, and respective lines are connected in the column input unit 152 through capacitors to be inputted to the comparator 151-1.

The switches SW11 and SW12 are selectively turned on/off appropriately at the time of reading all pixels and at the time of reading with one-to-one addition (or one-to-three addition and so on).

The column input unit 152 can reduce the number of times of AD conversion by combining analog addition using capacitors when pixel signals are added and read for realizing high-speed imaging and for improving S/N. As a result, the column input unit 152 realizes low-power consumption of the circuits of the solid-state imaging device 100 and further-higher imaging.

[Principle of Analog Addition Using Capacitors]

Figure 6:
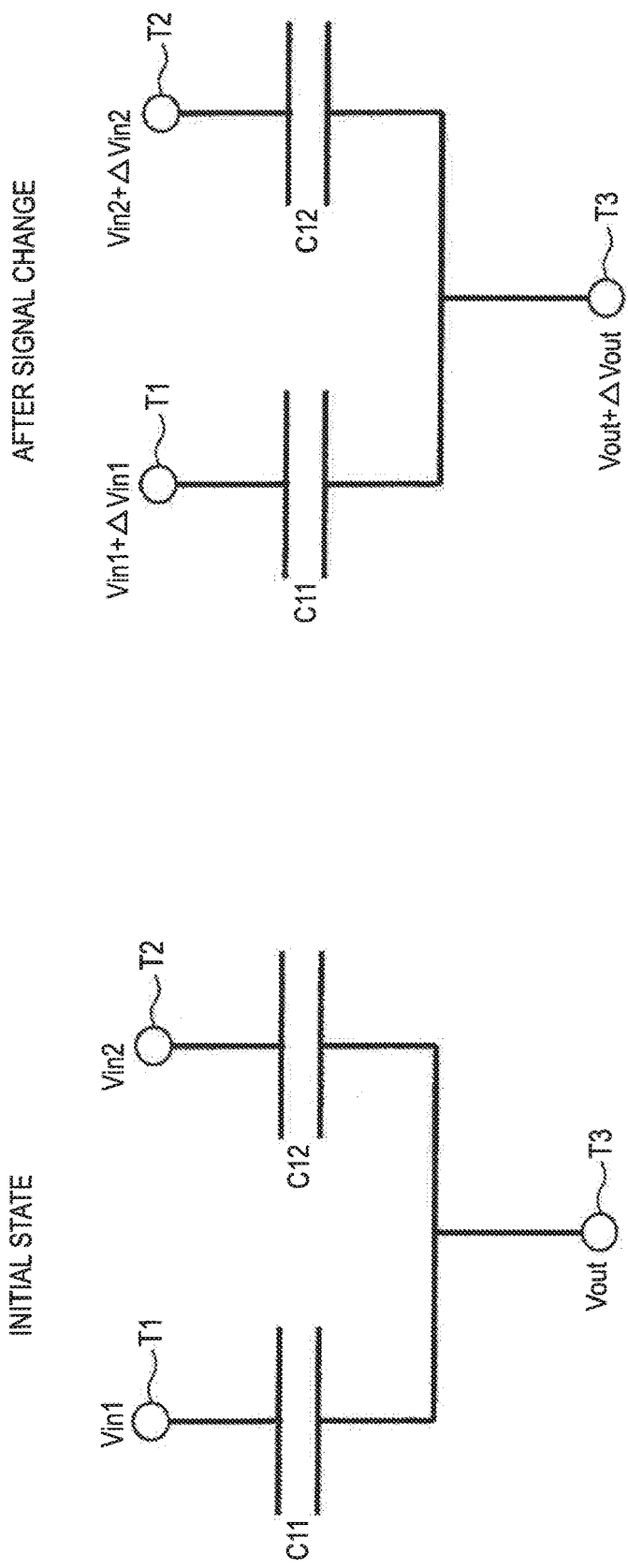
FIGS. 6A and 6B are diagram for explaining the principle of analog addition using capacitors.

FIGS. 6A and 6B are diagrams for specifically explaining the principle of analog addition using capacitors.

In FIGS. 6A and 6B, input terminals T1 and T2 are connected to an output terminal T3 through the capacitors C11 and C12.

When an input voltage signal Vin1 is applied to the input terminal TI and an input voltage signal Vin2 is applied to the input terminal T2 as voltage signals, an output voltage signal Vout is generated at the output terminal T3.

The output voltage Vout is represented by the following expression. Here, CI represents a capacitance value of the capacitor C11 and C2 represents a capacitance value of the capacitor C12.

FIG. 6A is a diagram for explaining addition operation by capacitors in an initial state and FIG. 6B is a diagram for explaining the addition operation by capacitors after signal change.

Electric charges Q1 and Q2 accumulated in the capacitors C11 and C12 are given by the following expressions in the initial state of FIG. 6A.

$$Q1 = C1(Vin1 - Vout)$$

$$Q2 = C2(Vin2 - Vout)$$

As shown in FIG. 6B, electric charges Q1' and Q2' accumulated in the capacitors C11 and C12 after the signal change are given by the following expression.

$$Q1' = C1\{(Vin1 + \Delta Vin1) - (Vout + \Delta Vout)\}$$

$$Q2' = C2\{(Vin2 + \Delta Vin2) - (Vout + \Delta Vout)\}$$

As a relation of Q1+Q2=Q1'+Q2' holds from charge conservation, the following expression can be obtained from the above four expressions.

$$\Delta Vout=1/(C1+C2)\times(C1\Delta Vin1+C2\Delta Vin2)$$

It is possible to perform weighting of addition by a capacitance ratio according to the above.
(i) When C1=C2 in the case of 1:1 addition, the following expression can be obtained.

$$\Delta Vout=1/2\times(\Delta Vin1+\Delta Vin2)$$

(ii) When C1=3C2 in the case of 1:3 addition, the following expression can be obtained.

$$\Delta Vout=1/4\times(3\Delta Vin1+\Delta Vin2)$$

It should also be noted that the output voltage Vout is not obtained by simple addition but obtained by weighted average in accordance with capacitance values. The maximum value of signal values does not change before addition and after addition, therefore, it is not necessary to change a dynamic range of the signal processing circuit at the subsequent stage.

Figure 7:
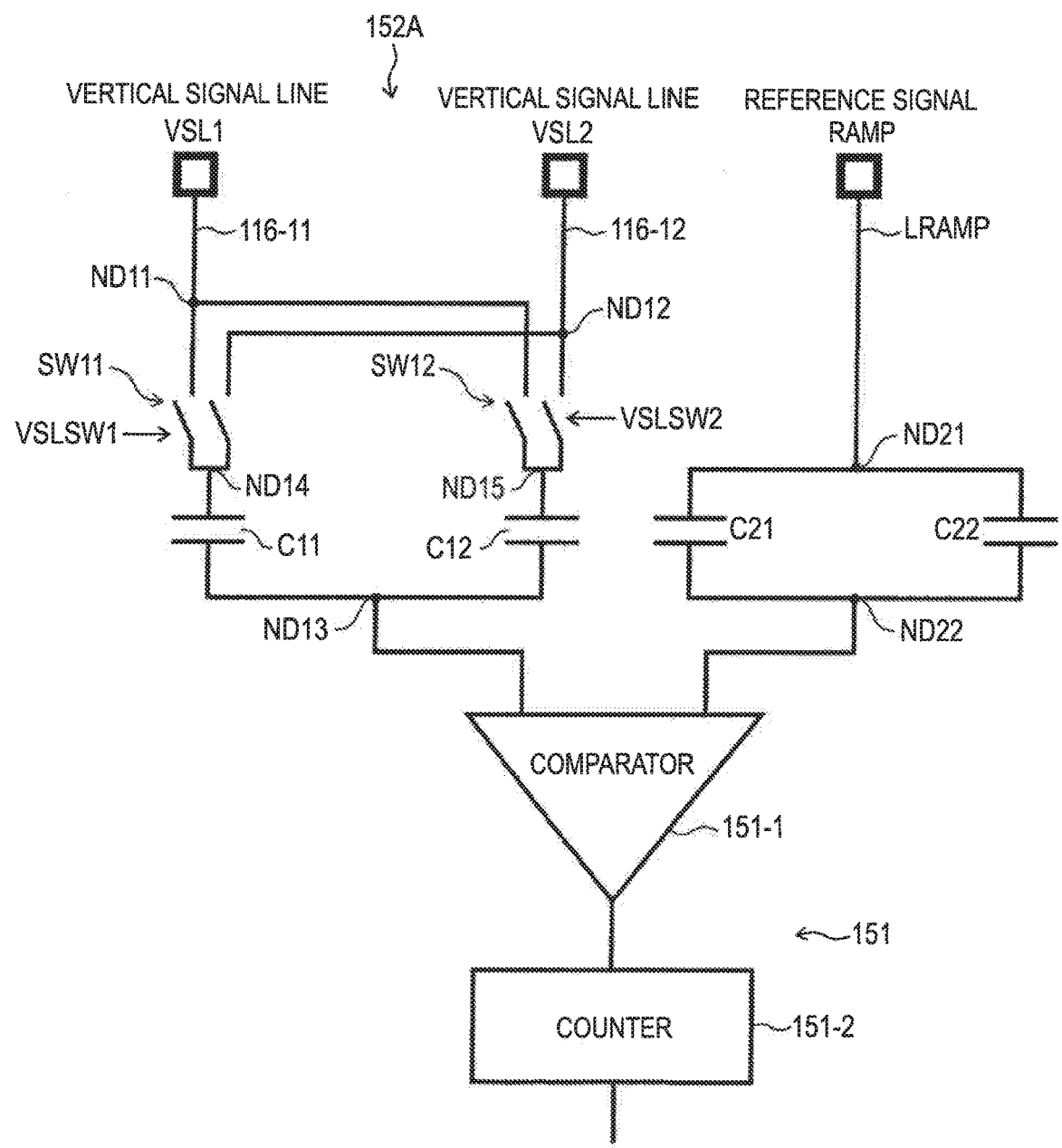
FIG. 7 is a diagram showing a first specific example of the column input unit according to the embodiment, which is the diagram showing the column input unit of FIG. 4 more specifically.

The configuration in which the analog addition using capacitors is used before (input stage) the column processing units 151 as ADCs is shown in FIG. 4 and FIG. 7 as the column input units 152.

[First Specific Example of the Column Input Unit]

FIG. 7 is a diagram showing a first specific example of the column input unit according to the embodiment, which is the diagram showing the column input unit of FIG. 4 more specifically.

Here, the first column is cited for explanation.

In FIG. 7, a column input unit 152A includes switches SW11, SW12, first capacitors C11, C12, second capacitors C21, C22 and nodes ND11 to ND15, ND21 and ND22.

The node ND11 is connected to the vertical signal line 116-11 to which an analog signal VSL1 is read and the node ND12 is connected to the signal line 116-12 to which an analog signal VSL2 is read.

The node ND13 is connected to the input terminal side of the signal VLS of the comparator 151-1 as well as the first terminal side of the capacitor C11 and the first terminal side of the capacitor C12.

The node ND14 is connected to the second terminal side of the capacitor C11 and the node ND1 5 is connected to the second terminal side of the capacitor C12.

The node ND21 is connected to a supply line LRAMP of the reference signal RAMP and the second terminal side of the capacitor C21 as well as the second terminal side of the capacitor C22.

The node ND22 is connected to the input terminal side of the reference signal RAMP of the comparator 151-1 and the first terminal side of the capacitor C21 and the first terminal side of the capacitor C22.

The switch SW11 connects the node ND14 to any of the node ND11 and the node ND12 in accordance with a switching signal VSLSW1.

That is, the switch SW11 can selectively connect the capacitor C11 to any of the vertical signal line 116-11 and the vertical signal line 116-12 in accordance with the switching signal VSLSW1.

The switch SW12 connects the node ND15 to any of the node ND11 and the node ND12 in accordance with a switching signal VSLSW2.

That is, the switch SW12 can selectively connect the capacitor C12 to any of the vertical signal line 116-11 to which the analog signal VSL1 is read and the vertical signal line 116-12 to which the analog signal VSL2 is read in accordance with the switching signal VSLSW2.

In this case, the switch SW11 connects the capacitor C11 to the vertical signal line 116-11 when the switching signal VSLSW1 is in a high level and connects the capacitor C11 to the vertical signal line 116-12 when the signal is in a low level.

Similarly, the switch SW12 connects the capacitor 12 to the vertical signal line 116-11 when the switching signal VSLSW2 is in a high level and connects the capacitor C12 to the vertical signal line 116-12 when the signal is in a low level.

Here, operations at the time of reading all pixels and at the time of reading pixels with one-to-one addition in the column input unit 152A of FIG. 7 will be explained.

FIG. 8 is a chart showing selective switching states of analog signals by the two switches SW11 and SW12 at the time of reading all pixels and at the time of reading pixels with one-to-one addition in the column input unit of FIG. 7.

Figure 9:
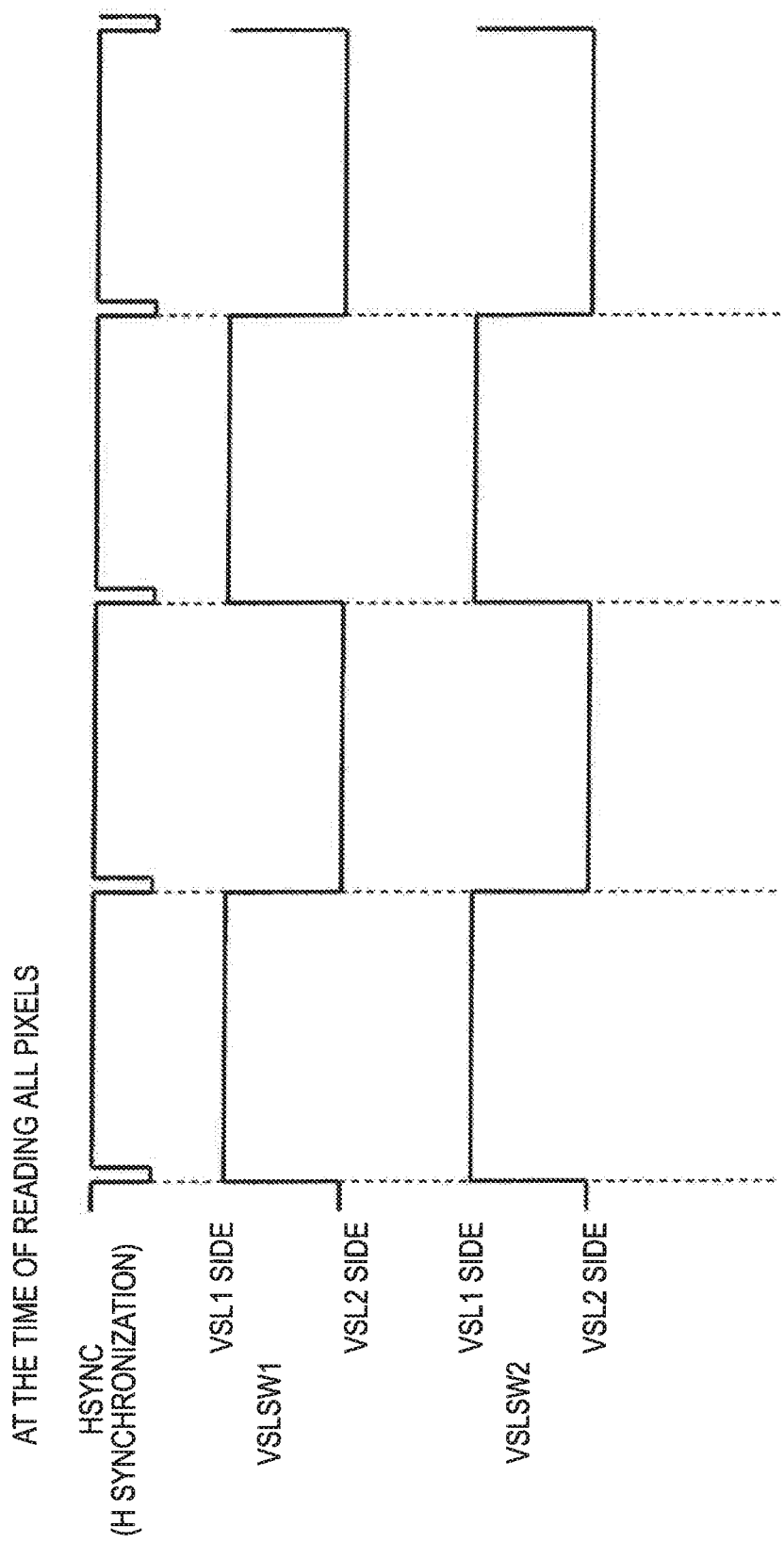
FIG. 9 is a timing chart at the time of reading all pixels in the column input unit of FIG. 7.

FIG. 9 is a timing chart at the time of reading all pixels in the column input unit of FIG. 7.

Figure 10:
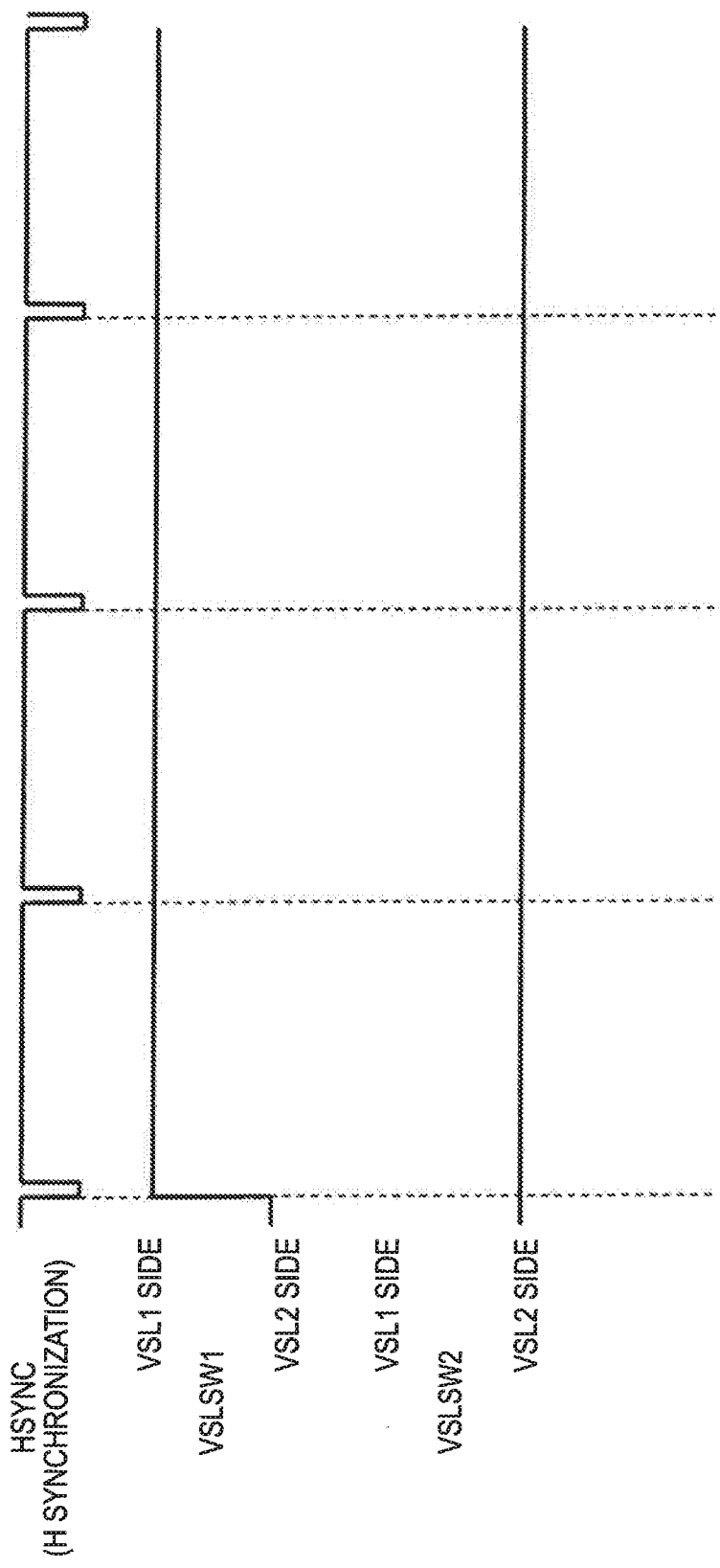
FIG. 10 is a timing chart at the time of reading pixels with one-to-one addition in the column input unit of FIG. 7.

FIG. 10 is a timing chart at the time of reading pixels with one-to-one addition in the column input unit of FIG. 7.

In FIG. 9 and FIG. 10, HSYNC represents a horizontal synchronization signal.

At the time of reading all pixels, the switching signal VSLSW1 and VSLSW2 are switched in the same level in synchronization with the horizontal synchronization signal HSYNC.

As shown in FIG. 9, the switching signals VSLSW1 and VSLSW2 are set in the same high level in synchronization with the horizontal synchronization signal HSYNC.

Accordingly, the capacitors C11 and C12 are connected to the vertical signal line 116-11, and the analog signal VSL1 read to the vertical signal line 116-11 is inputted to the input terminal for the read signal of the comparator 151-1 through parallel capacitors of the capacitors C11 and C12.

Next, as shown in FIG. 9, the switching signals VSLSW1 and VSLSW2 are switched in the low level in synchronization with the horizontal synchronization signal HSYNC.

Accordingly, the capacitors C11 and C12 are connected to the vertical signal line 116-12, and the analog signal VVSL2 read to the vertical signal line 116-2 is inputted to the input terminal of the read signal of the comparator 151-1 through the parallel capacitors of the capacitors C11 and C12.

At the time of reading with one-to-one addition, the switching signal VSLSW1 is fixed to the high level and the switching signal VSLSW2 is fixed to the low level in synchronization with the horizontal synchronization signal SHYNC.

Accordingly, the capacitor C11 is connected to the vertical signal line 116-11 and the capacitor C12 is connected to the vertical signal line 116-12.

As a result, the analog signal VSL1 read to the vertical signal line 116-11 is supplied to the node ND13 through the capacitor C11 and the analog signal VSL2 read to the vertical signal line 116-12 is supplied to the node ND13 through the capacitor C12, and analog addition using capacitors is performed. The result of analog addition using capacitors is a weighted average value obtained in accordance with capacitance values to be inputted to the input terminal of the read signal of the comparator 151-1.

[Second Specific Example of the Column Input Unit]

Next, a configuration of the column input unit in which the capacitors to be connected to two vertical signal lines are switched by switches, and weighting of addition can be changed in the analog signal VSL1 of the vertical signal line 116-11 and the analog signal VSL2 of the vertical signal line 116-12 will be explained as a second specific example.

Figure 11:
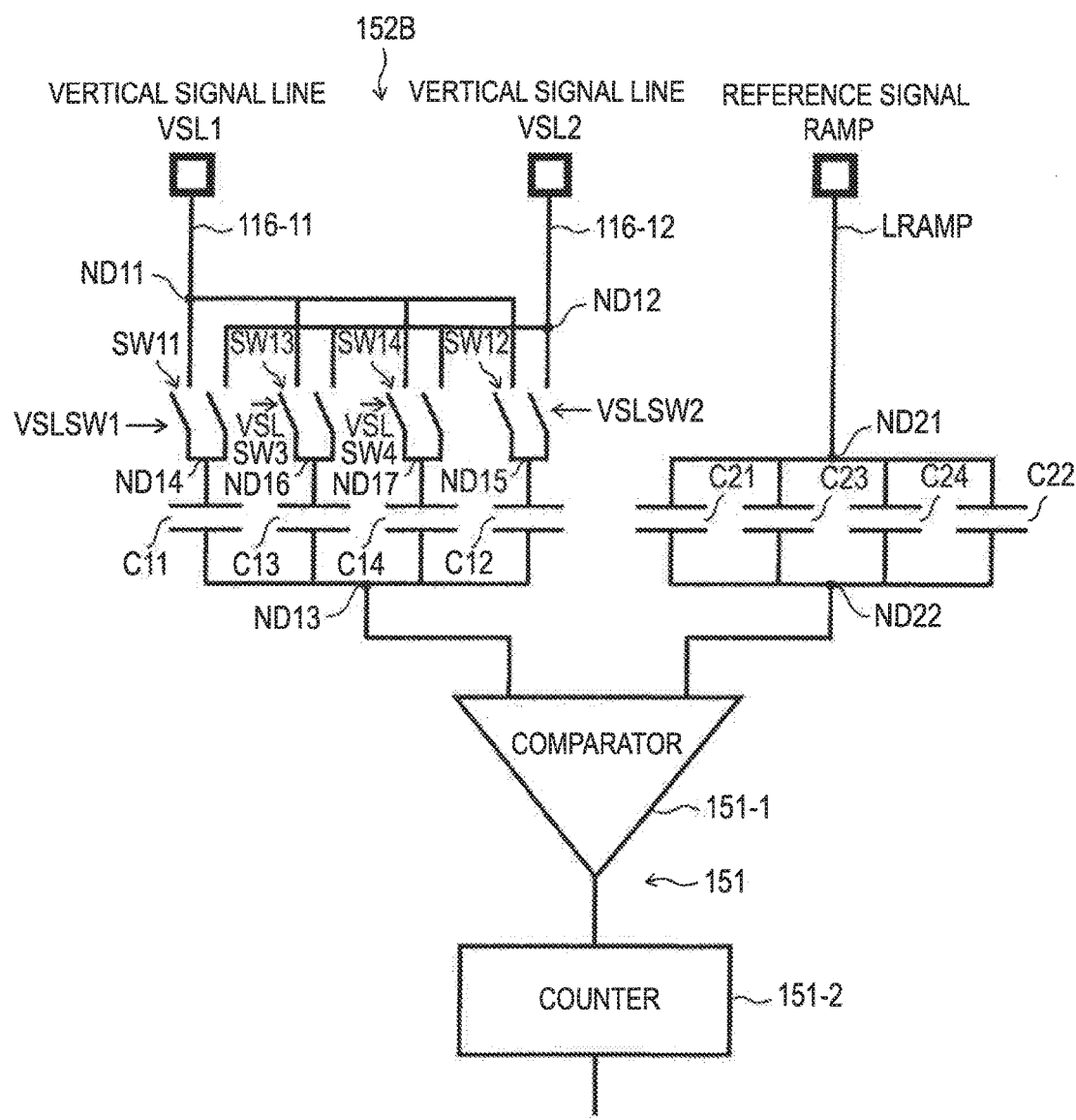
FIG. 11 is a diagram showing a second specific example of the column input unit according to the embodiment, which is the diagram showing a configuration example of the column input unit in which the capacitors connected to two vertical signal lines are switched by switches and weighting of addition in the analog signals of respective vertical signal lines can be changed.

FIG. 11 is a diagram showing the second specific example of the column input unit according to the embodiment, which is the diagram showing a configuration example of the column input unit in which the capacitors connected to two vertical signal lines are switched by switches and weighting of addition in the analog signals of respective vertical signal lines can be changed.

Also in this case, the first column is cited for explanation.

A column input unit 152B of FIG. 11 is configured to be able to perform at least reading of all pixels, reading with one-to-one addition and reading with one-to-three addition.

The column input unit 152B of FIG. 11 includes four first capacitors C11 to C14, four second capacitors C21 to C24 both on the analog signal side and the reference signal side as well as four switches SW11 to SW14.

In FIG. 11, the same numerals and signs are given to the same components as FIG. 7 to make the explanation easy to understand.

The column input unit 152B of FIG. 11 includes switches SW11 to SW14, first capacitors C11 to C14, second capacitors C21 to C24, nodes ND11 to ND17, ND21 and ND22.

The node ND11 is connected to the vertical signal line 116-11 to which the analog signal VSL1 is read and the node ND12 is connected to the vertical signal line 116-12 to which the analog signal VSL2 is read.

The node ND13 is connected to the input terminal side of the signal VSL of the comparator 151-1 as well as the first input terminal side of the capacitors C11 to C14 connected in parallel with respect to the node ND13.

The node ND14 is connected to the second terminal side of the capacitor C11 and the node ND1 5 is connected to the second terminal side of the capacitor C12.

The node ND16 is connected to the second terminal side of the capacitor C13 and the node ND1 7 is connected to the second terminal side of the capacitor C14.

The node ND21 is connected to the supply line LRAM of the reference signal RAMP and the second terminal side of the capacitors C21 to C24 connected in parallel between the node ND21 and ND22.

The node ND22 is connected to the input terminal side of the reference signal RAMP of the comparator 151-1 as well as a first terminal side of the capacitors C21 to C24.

The switch SW11 connects the node ND14 to any of the node ND11 and ND12 in accordance with the switching signal VSLSW1.

That is, the switch SW11 can selectively connect the capacitor C11 to any of the vertical signal line 116-11 and the vertical signal line 116-12 in accordance with the switching signal VSLSW1.

The switch SW12 connects the node ND15 to any of the node ND11 and the node ND12 in accordance with the switching signal VSLSW2.

That is, the switch SW12 can selectively connect the capacitor C12 to any of the vertical signal line 116-11 to which the analog signal VSL1 is read and the vertical signal line 116-12 to which the analog signal VLS2 is read in accordance with the switching signal VSLSW2.

The switch SW13 connects the node ND16 to any of the node ND11 and the node ND12 in accordance with a switching signal VSLSW3.

That is, the switch SW13 can selectively connect the capacitor C13 to any of the vertical signal line 116-11 to which the analog signal VSL1 is read and the vertical signal line 116-12 to which the analog signal VLS2 is read in accordance with the switching signal VSLSW3.

The switch SW14 connects the node ND17 to any of the node ND11 and the node ND12 in accordance with a switching signal VSLSW4.

That is, the switch SW14 can selectively connect the capacitor C14 to any of the vertical signal line 116-11 to which the analog signal VSL1 is read and the vertical signal line 116-12 to which the analog signal VLS2 is read in accordance with the switching signal VSLSW4.

In this case, the switch SW11 connects the capacitor C11 to the vertical signal line 116-11 when the switching signal VSLSW1 is in the high level and connects the capacitor C11 to the vertical signal line 116-12 when the switching signal VSLSW1 is in the low level as an example.

Similarly, the switch SW12 connects the capacitor C12 to the vertical signal line 116-11 when the switching signal VSLSW2 is in the high level and connects the capacitor C12 to the vertical signal line 116-12 when the switching signal VSLSW2 is in the low level.

The switch SW13 connects the capacitor C13 to the vertical signal line 116-11 when the switching signal VSLSW3 is in the high level and connects the capacitor C13 to the vertical signal line 116-12 when the switching signal VSLSW3 is in the low level.

The switch SW14 connects the capacitor C14 to the vertical signal line 116-11 when the switching signal VSLSW4 is in the high level and connects the capacitor C14 to the vertical signal line 116-12 when the switching signal VSLSW4 is in the low level.

Here, operations performed by the column input unit 152B of FIG. 11 at the time of reading all pixels, at the time of reading pixels with one-to-one addition and at the time of reading pixels with one-to-three addition will be explained.

FIG. 12 is a chart showing selective switching states of analog signals by the four switches SW11 to SW14 at the time of reading all pixels, at the time of reading pixels with one-to-one addition and at the time of reading pixels with one-to-three addition in the column input unit of FIG. 11.

Figure 13:
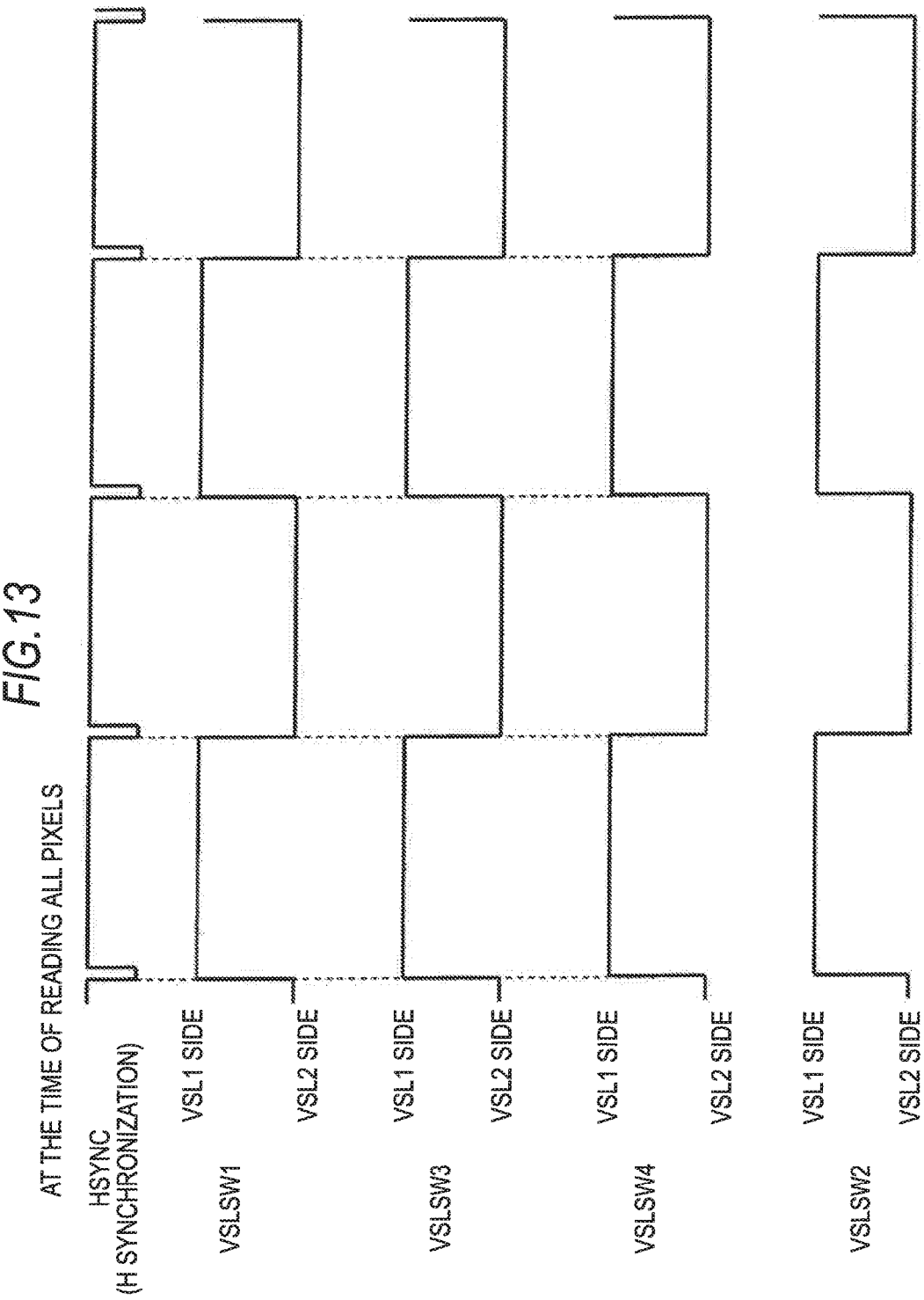
FIG. 13 is a timing chart at the time of reading all pixels in the column input unit of FIG. 11.

FIG. 13 is a timing chart at the time of reading all pixels in the column input unit of FIG. 11.

Figure 14:
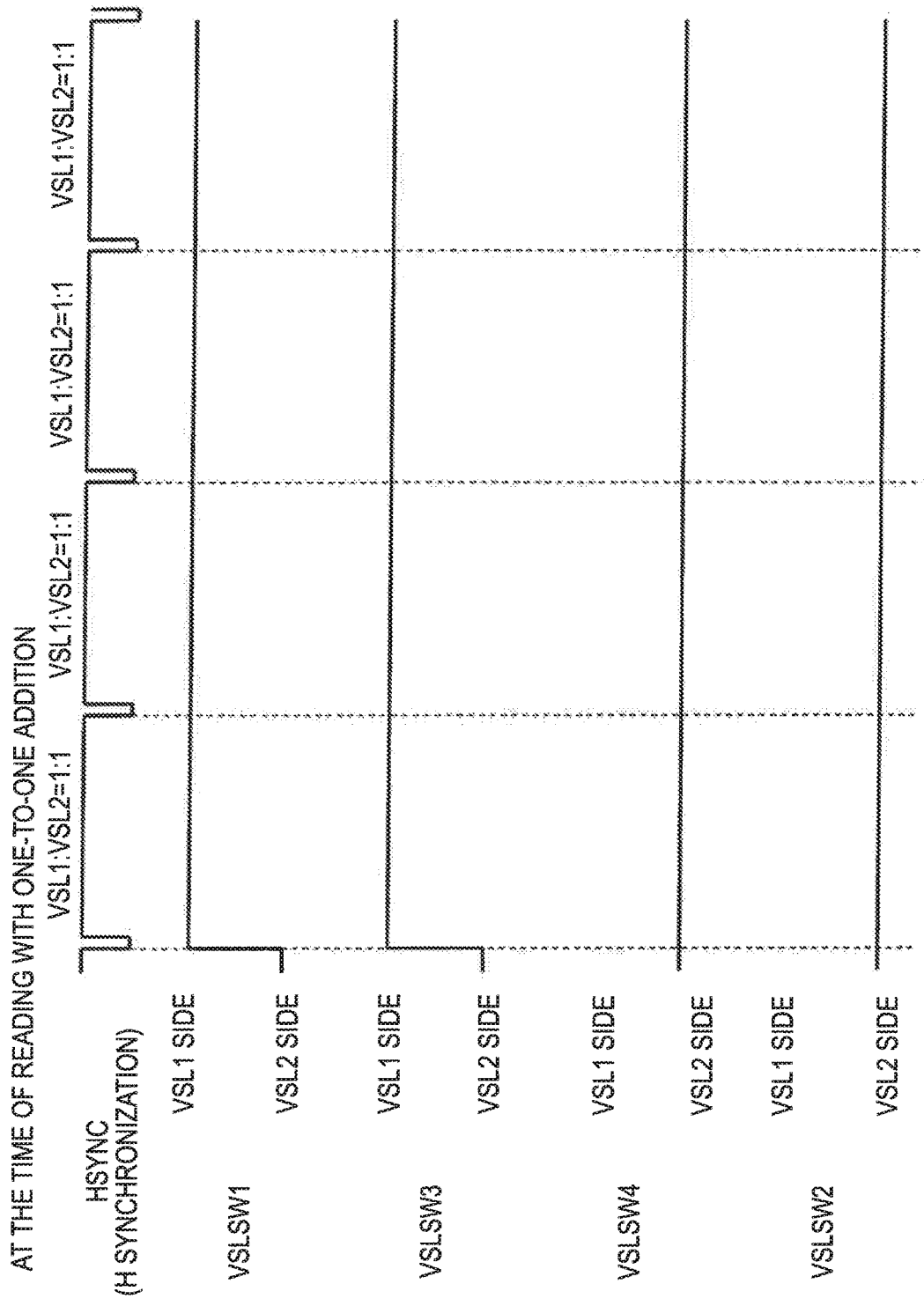
FIG. 14 is a timing chart at the time of reading pixels with one-to-one addition in the column input unit of FIG. 11.

FIG. 14 is a timing chart at the time of reading pixels with one-to-one addition in the column input unit of FIG. 11.

Figure 15:
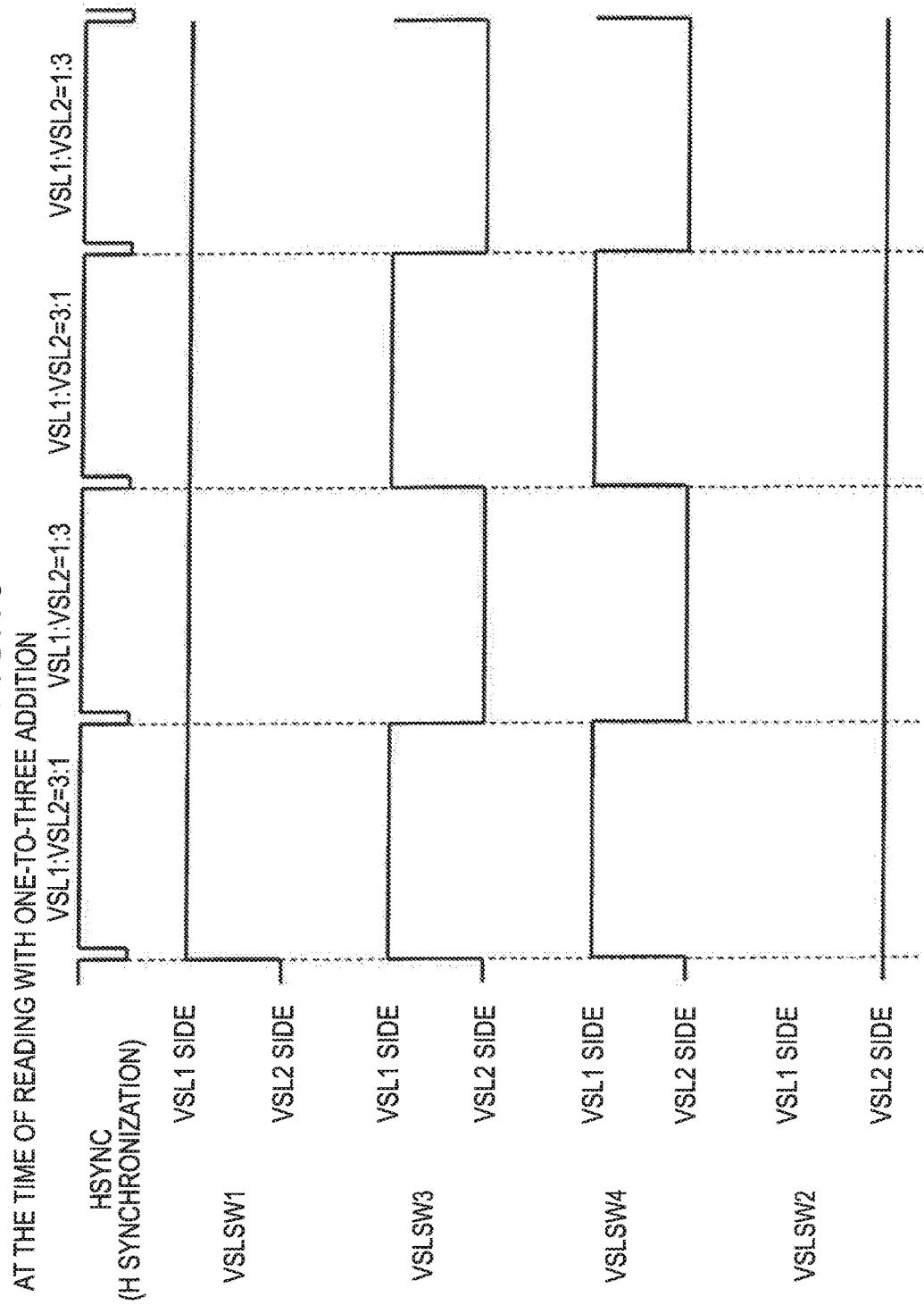
FIG. 15 is a timing chart at the time of reading pixels with one-to-three addition in the column input unit of FIG. 11.

FIG. 15 is a timing chart at the time of reading pixels with one-to-three addition in the column input unit of FIG. 11.

At the time of reading all pixels, the switching signals VSLSW1 to VSLSW4 are switched in the same level in synchronization with the horizontal synchronization signal HSYNC as shown in FIG. 12 and FIG. 13.

For example, the switching signals VSLSW1 to VSLSW4 are set in the same high level in synchronization with the horizontal synchronization signal HSYNC.

Accordingly, the capacitors C11 to C14 are connected to the vertical signal line 116-11, and the analog signal VSL1 read to the vertical signal line 116-11 is inputted to the input terminal for the read signal of the comparator 151-1 through parallel capacitors of the capacitors C11 to C14.

Next, the switching signals VSLSW1 to VSLSW4 are switched in the same low level in synchronization with the horizontal synchronization signal HSYNC.

Accordingly, the capacitors C11 to C14 are connected to the vertical signal line 116-12, and the analog signal VSL2 read to the vertical signal line 116-12 is inputted to the input terminal for the read signal of the comparator 151-1 through parallel capacitors of the capacitors C11 to C14.

At the time of reading with one-to-one addition, the switching signals VSLSW1 and VSLSW3 are fixed to the high level of the horizontal synchronization signal HYVC and the switching signals VSLSW2 and VSLSW4 are fixed to the low level in synchronization with the horizontal synchronization signal SHYNC as shown in FIG. 12 and FIG. 14.

Accordingly, the capacitors C11 and C13 are connected to the vertical signal line 116-11 and the capacitors C12 and C14 are connected to the vertical signal line 116-12.

As a result, the analog signal VSL1 read to the vertical signal line 116-11 is supplied to the node ND13 through the capacitors C11 and C13 and the analog signal VSL2 read to the vertical signal line 116-12 is supplied to the node ND13 through the capacitors C12 and C14, and analog addition using capacitors is performed. The result of analog addition using capacitors is a weighted average value obtained in accordance with capacitance values to be inputted to the input terminal for the read signal of the comparator 151-1.

At the time of reading with one-to-three addition, the switching signal VSLSW1 is fixed to the high level of the horizontal synchronization signal HYVC and the switching signal VSLSW2 is fixed to the low level in synchronization with the horizontal synchronization signal SHYNC as shown in FIG. 12 and FIG. 15.

Accordingly, the capacitor C11 is connected to the vertical signal line 116-11 and the capacitor C12 is connected to the vertical signal line 116-12.

The switching signals VSLSW3 and VSLSW4 are switched to the same level in synchronization with the horizontal synchronization signal HSYNC.

For example, the switching signals VSLSW3 and VSLSW4 are set in the same high level in synchronization with the horizontal synchronization signal HSYNC.

Accordingly, the capacitors C13 and C14 are connected to the vertical signal line 116-11.

As a result, the analog signal VSL1 read to the vertical signal line 116-11 is supplied to the node ND13 through the capacitors C11, C13 and C14 and the analog signal VSL2 read to the vertical signal line 116-12 is supplied to the node ND13 through the capacitor C12, and analog addition using capacitors is performed.

The result of analog addition using capacitors is a weighted average value obtained in accordance with capacitance values to be inputted to the input terminal for the read signal of the comparator 151-1.

Next, the switching signals VSLSW3 and VSLSW4 are switched in the same low level in synchronization with the horizontal synchronization signal HSYNC.

Accordingly, the capacitors C13 and C14 are connected to the vertical signal line 116-12.

As a result, the analog signal VSL1 read to the vertical signal line 116-11 is supplied to the node ND13 through the capacitor C11 and the analog signal VSL2 read to the vertical signal line 116-12 is supplied to the node ND13 through the capacitors C12, C13 and C14, and analog addition using capacitors is performed.

The result of analog addition using capacitors is a weighted average value obtained in accordance with capacitance values to be inputted to the input terminal for the read signal of the comparator 151-1.

[Example of a Specific Circuit Diagram of the Column Input Unit]

Next, an example of a further specific circuit diagram of the column input unit of FIG. 11 will be explained.

Figure 16:
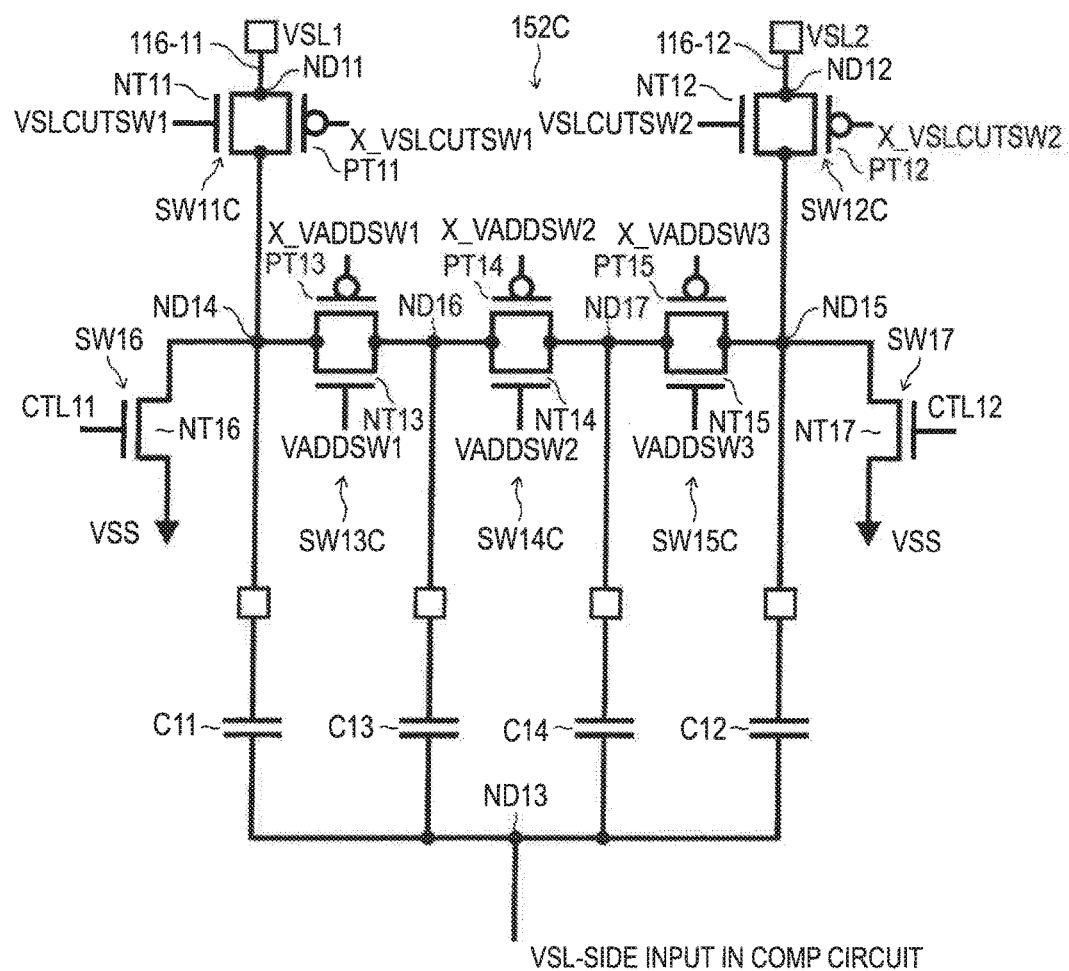
FIG. 16 is a diagram showing a third specific example of the column input unit according to the embodiment, which shows the column input unit of FIG. 11 more specifically.

FIG. 16 is a diagram showing a third specific example of the column input unit according to the embodiment, which shows the column input unit of FIG. 11 more specifically.

In FIG. 16, the input unit of the reference signal RAMP is omitted.

The first column is cited for explanation also in this case.

A column input unit 152C of FIG. 16 is configured to be able to perform at least reading of all pixels, reading with one-to-one addition and reading with one-to-three addition. The column input unit 152C of FIG. 16 includes four first capacitors C11 to C14, four second capacitors C21 to C24 both on the analog signal side and the reference signal side as well as five switches SW11C to SW15C.

In FIG. 16, the same numerals and signs are given to the same components as FIG. 11 to make the explanation easy to understand.

The column input unit 152C of FIG. 16 includes switches SW11 to SW15, switches SW16 and SW17, capacitors C11 to C14, C21 to C24, nodes ND11 to ND17, ND21 and ND22.

In the column input unit 152C, the switches SW11C to SW15C are formed by transfer gates (CMOS switches) and a connection state thereof partly differs from FIG. 11.

The node ND11 is connected to the vertical signal line 116-11 to which the analog signal VSL1 is read and the node ND12 is connected to the vertical signal line 116-12 to which the analog signal VSL2 is read.

The node ND13 is connected to the input terminal side of the signal VSL in the comparator 151-1 as well as to the first terminal side of the capacitors C11 to C14 connected in parallel to the node ND13.

The node ND14 is connected to the second input terminal side of the capacitor C11 and the node ND15 is connected to the second terminal side of the capacitor C12.

The node ND16 is connected to the second terminal side of the capacitor C13 and the node ND1 7 is connected to the second terminal side of the capacitor C14.

The switch SW11C selectively connects the node ND14 to the node ND11 in accordance with a switching signal VSLCUTSW1 and an inversion signal X_VSLCUTSW1 (X represents inversion).

The switch SW11C is formed by a transfer gate having two terminals in which a source and a drain of an n-channel MOS (NMOS) transistor NT11 and a source and a drain of a p-channel MOS (PMOS) transistor PT11 are connected to each other.

One terminal of the switch SW11C is connected to the node ND11 and the other terminal is connected to the node ND14.

In the switch SW11C, the switching signal VSLCUTSW1 is supplied to a gate of the NMOS transistor NT11 forming the transfer gate, and the inversion signal X VSLCUTSW1 of the switching signal VSLCUTSW1 is supplied to a gate of the PMOS transistor PT11.

The switch SW11C becomes conductive (ON) when the switching signal VSLCUTSW1 is in the high level and connects the node ND14 to the node ND11 (vertical signal line 116-11) as well as becomes non-conductive (OFF) when the switching signal VSLCUTSW1 is in the low level and makes the node ND11 and the node ND14 be in the non-conductive state.

The switch SW12C selectively connects the node ND15 to the node ND12 in accordance with a switching signal VSLCUTSW2 and an inversion signal X_VSLCUTSW2.

The switch SW12C is formed by a transfer gate having two terminals in which a source and a drain of an NMOS transistor NT12 and a source and a drain of a PMOS transistor PT12 are connected to each other.

One terminal of the switch SW12C is connected to the node ND12 and the other terminal is connected to the node ND15.

In the switch SW12C, the switching signal VSLCUTSW2 is supplied to a gate of the NMOS transistor NT12 forming the transfer gate, and the inversion signal X_VSLCUTSW2 of the switching signal VSLCUTSW2 is supplied to a gate of the PMOS transistor PT12.

The switch SW12C becomes conductive (ON) when the switching signal VSLCUTSW2 is in the high level and connects the node ND15 to the node ND12 (vertical signal line 116-11) as well as becomes non-conductive (OFF) when the switching signal VSLCUTSW2 is in the low level and makes the node ND12 and the node ND15 be in the non-conductive state.

The switch SW13C selectively connects the node ND14 and ND16 in accordance with a switching signal VADDSW1 and an inversion signal X_VADDSW1.

The switch SW13C is formed by a transfer gate having two terminals in which a source and a drain of an NMOS transistor NT13 and a source and a drain of a PMOS transistor PT13 are connected to each other.

One terminal of the switch SW13C is connected to the node ND14 and the other terminal is connected to the node ND16.

In the switch SW13C, the switching signal VADDSW1 is supplied to a gate of the NMOS transistor NT13 forming the transfer gate, and the inversion signal X_VADDSW1 of the switching signal VADDSW1 is supplied to a gate of the PMOS transistor PT13.

The switch SW13C becomes conductive (ON) when the switching signal VADDSW1 is in the high level and connects the node ND14 to the node ND16 as well as becomes non-conductive (OFF) when the switching signal VADDSW1 is in the low level and makes the node ND14 and the node ND16 be in the non-conductive state.

The switch SW14C selectively connects the node ND16 and the node ND17 in accordance with a switching signal VADDSW2 and an inversion signal X_VADDSW2.

The switch SW14C is formed by a transfer gate having two terminals in which a source and a drain of an NMOS transistor NT14 and a source and a drain of a PMOS transistor PT14 are connected to each other.

One terminal of the switch SW14C is connected to the node ND16 and the other terminal is connected to the node ND17.

In the switch SW14C, the switching signal VADDSW2 is supplied to a gate of the NMOS transistor NT14 forming the transfer gate, and the inversion signal X VADDSW2 of the switching signal VADDSW2 is supplied to a gate of the PMOS transistor PT14.

The switch SW14C becomes conductive (ON) when the switching signal VADDSW2 is in the high level and connects the node ND16 to the node ND17 as well as becomes non-conductive (OFF) when the switching signal VADDSW2 is in the low level and makes the node ND16 and the node ND17 be in the non-conductive state.

The switch SW15C selectively connects the node ND15 and the node ND17 in accordance with a switching signal VADDSW3 and an inversion signal X_VADDSW3.

The switch SW15C is formed by a transfer gate having two terminals in which a source and a drain of an NMOS transistor NT15 and a source and a drain of a PMOS transistor PT15 are connected to each other.

One terminal of the switch SW15C is connected to the node ND15 and the other terminal is connected to the node ND17.

In the switch SW15C, the switching signal VADDSW3 is supplied to a gate of the NMOS transistor NT15 forming the transfer gate, and the inversion signal X_VADDSW3 of the switching signal VADDSW3 is supplied to a gate of the PMOS transistor PT15.

The switch SW15C becomes conductive (ON) when the switching signal VADDSW3 is in the high level and connects the node ND15 to the node ND17 as well as becomes non-conductive (OFF) when the switching signal VADDSW3 is in the low level and makes the node ND15 and the node ND17 be in the non-conductive state.

The switch SW16 is connected between the node ND14 and a reference potential VSS, which is used for resetting the node ND14 at a predetermined timing.

The switch SW16 is formed by, for example, an NMOS transistor NT16.

In the NMOS transistor NT16, a drain is connected to the node ND14, a source is connected to the reference potential VSS and a gate is connected to a supply line of a control signal CTL11.

The switch SW17 is connected between the node ND15 and the reference potential VSS, which is used for resetting the node ND15 at a predetermined timing.

The switch SW17 is formed by, for example, an NMOS transistor NT17.

In the NMOS transistor NT17, a drain is connected to the node ND15, a source is connected to the reference potential VSS and a gate is connected to a supply line of a control signal CTL12.

Here, operations performed by the column input unit 152C of FIG. 16 at the time of reading all pixels, at the time of reading pixels with one-to-one addition and at the time of reading pixels with one-to-three addition will be explained.

Figure 17:
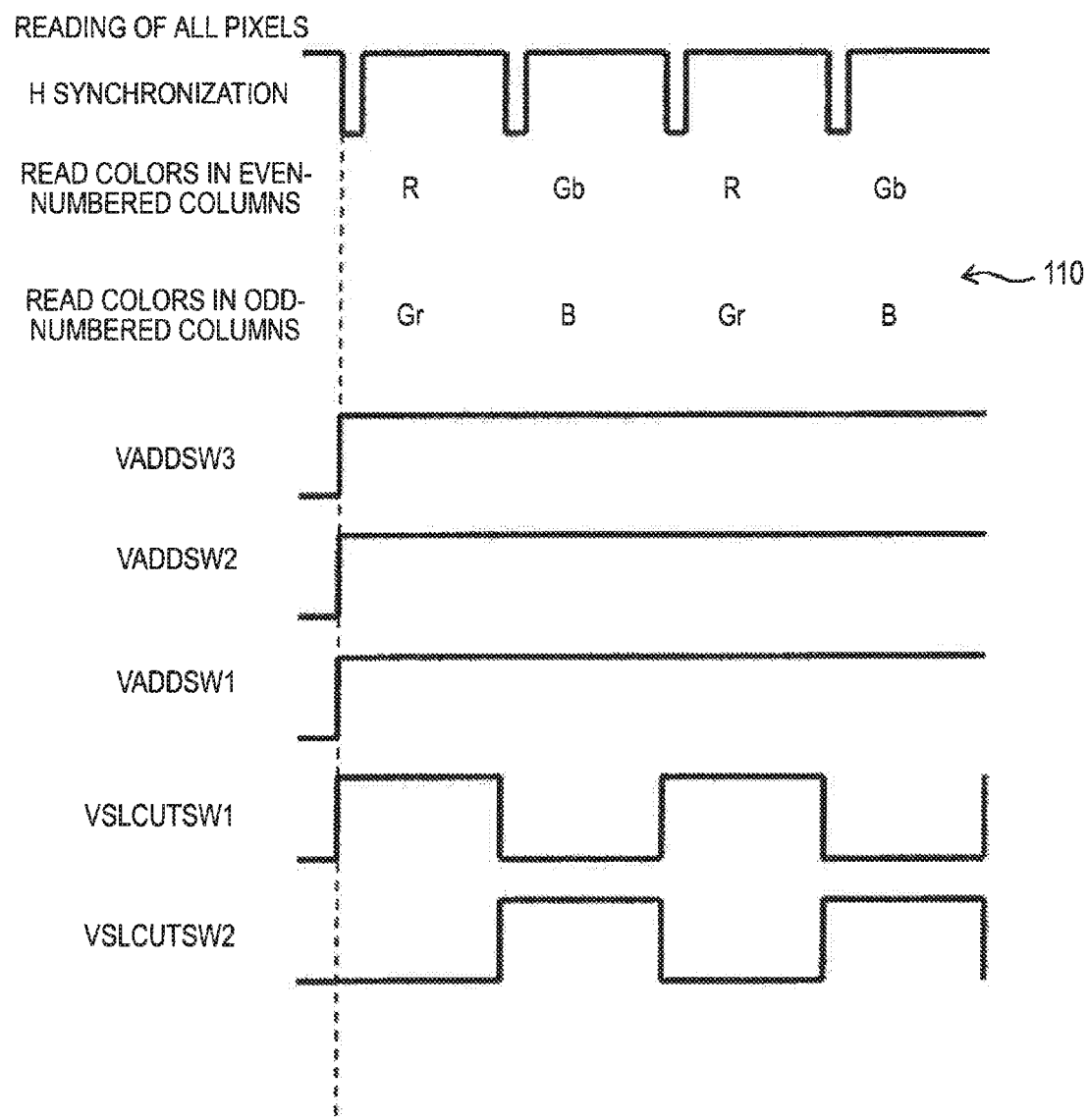
FIG. 17 is a timing chart at the time of reading all pixels in the column input unit of FIG. 16.

FIG. 17 is a timing chart at the time of reading all pixels in the column input unit of FIG. 16.

Figure 18:
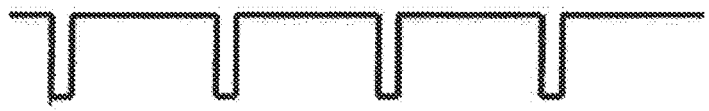
FIG. 18 is a timing chart at the time of reading pixels with one-to-one addition in the column input unit of FIG. 16.

FIG. 18 is a timing chart at the time of reading pixels with one-to-one addition in the column input unit of FIG. 16.

Figure 19:
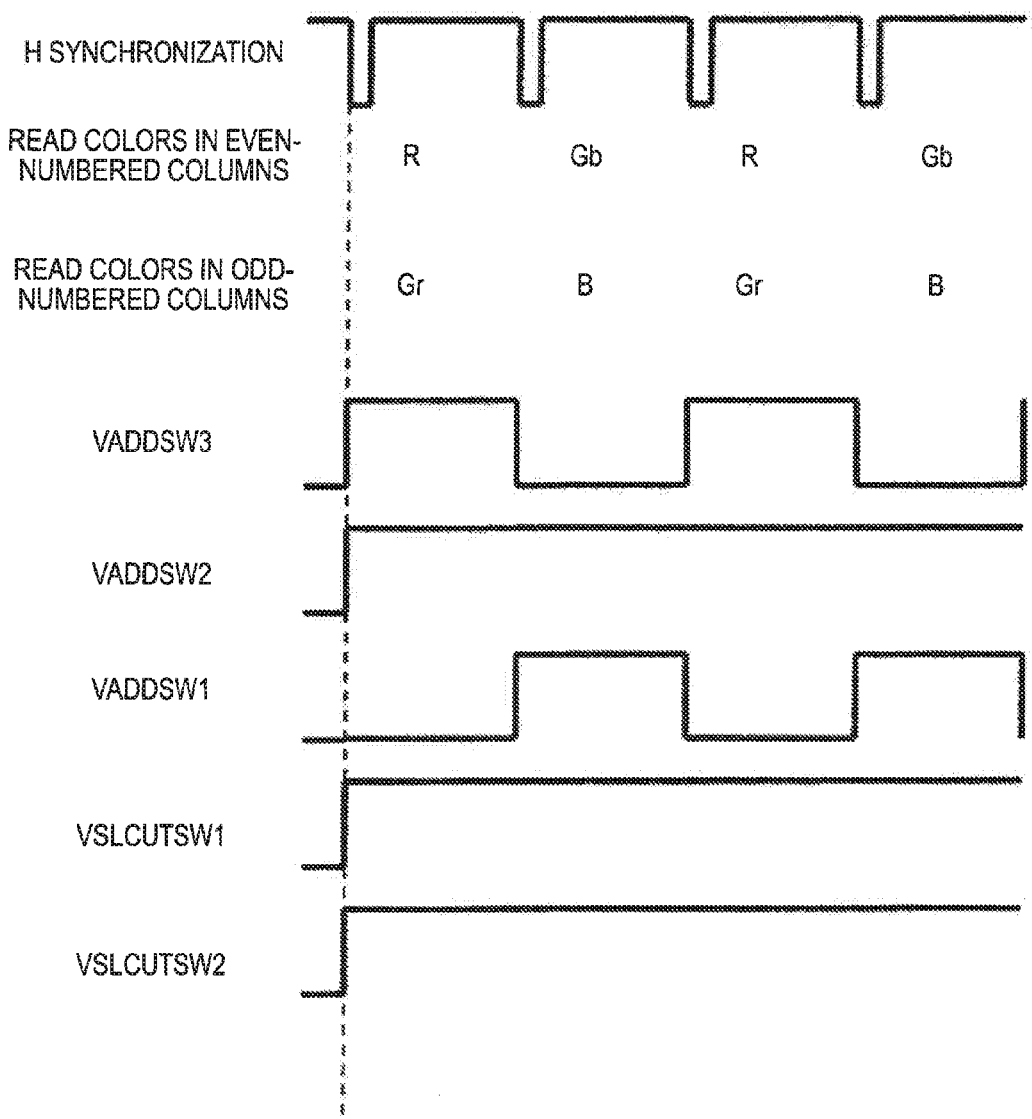
FIG. 19 is a timing chart at the time of reading pixels with one-to-three addition in the column input unit of FIG. 16.

FIG. 19 is a timing chart at the time of reading pixels with one-to-three addition in the column input unit of FIG. 16.

In the pixel array unit 110 in the example, Bayer arrangement is applied, in which pixels of Gr, Gb, R and B are arranged in a square shape as shown in FIG. 17 to FIG. 19.

At the time of reading all pixels, switching signals VADDSW1, VADDSW2 and VADDSW3 of switches SW13C, SW14C and SW15C are fixed to the high level in synchronization with the horizontal synchronization signal HSYNC.

As a result, the switches SW13C, SW14C and SW15C are in the conductive state and the node ND14 is connected to the node ND15.

Also at the time of reading all pixels, the switching signals VSLCUTSW1 and VSLCUTSW2 are in a complementary level in synchronization with the horizontal synchronization signal HSYNC.

For example, the switching signal VSLCUTSW1 is set to the same high level in synchronization with the horizontal synchronization signal HSYNC and the switching signal VSLCUTSW2 is set to the low level.

Accordingly, the capacitors C11 to C14 are connected to the vertical signal line 116-11 and the analog signal VSL1 read to the vertical signal line 116-11 (analog addition using capacitors is performed) is inputted to the input terminal of the read signal of the comparator 151-1 through the capacitors C11 to C14.

Next, the switching signal VSLCUTSW1 is switched to the same low level in synchronization with the horizontal synchronization signal HSYNC and the switching signal VSLCUTSW2 is switched to the high level.

Accordingly, the capacitors C11 to C14 are connected to the vertical signal line 116-12 and the analog signal VSL2 read to the vertical signal line 116-12 (analog addition using capacitors is performed) is inputted to the input terminal of the read signal of the comparator 151-1 through the capacitors C11 to C14.

At the time of reading with one-to-one addition, the switching signals VADDSW1 and VADDSW3 of the switches SW13C and SW15C are fixed to the high level in synchronization with the horizontal synchronization signal HSYNC. The switching signal VADDSW2 of the switch SW14C is fixed to the low level.

As a result, the switches SW13C and SW15C become conductive and the switch SW14C becomes non-conductive.

Accordingly, the node ND14C and the node ND16 as well as the node ND15 and the node ND17 are connected, and the node ND16 and the node ND17 are in the non-conductive state.

Also at the time of reading with one-to-one addition, the switching signals VSLCUTSW1 and VSLCUTSW2 are fixed to the high level in synchronization with the horizontal signal HSYNC and the switches SW11C and SW12C become conductive.

Accordingly, the capacitors C11 and C13 are connected to the vertical signal line 116-11 and the capacitors C12 and C14 are connected to the vertical signal line 116-12.

As a result, the analog signal VSL1 read to the vertical signal line 116-11 is supplied to the node ND 13 through the capacitors C11 and C13 and the analog signal VSL2 read to the vertical signal line 116-12 are supplied to the node ND13 through the capacitors C12 and C14, and analog addition using capacitors is performed. The result of analog addition using capacitors is a weighted average value obtained in accordance with capacitance values to be inputted to the input terminal of the read signal of the comparator 151-1.

At the time of reading with one-to-three addition, the switching signals VSLCUTSW1 and VSLCUTSW2 are fixed to the high level in synchronization with the horizontal synchronization signal HSYNC, and the switches SW11 and SW12 are maintained in the conductive state.

Also at the time of reading with one-to-three addition, the switching signal VADDSW2 is fixed to the high level in synchronization with the horizontal synchronization signal HSYNC, and the switch SW14C is maintained in the conductive state.

Then, at the time of reading with one-to-three addition, the switching signals VADDSW1 and VADDSW3 are in the complementary level in synchronization with the horizontal synchronization signal HSYNC.

For example, the switching signal VADDSW3 is set to the same high level in synchronization with the horizontal synchronization signal HSYNC, and the switching signal VADDSW1 is set to the low level.

At this time, the node ND15 and the node ND16 become conductive and the node ND14 and the node ND16 become non-conductive.

Accordingly, the capacitor C11 is connected to the vertical signal line 116-11 and the capacitors C12, C13 and C14 are connected to the vertical signal line 116-12.

As result, the analog signal VSL1 read to the vertical signal line 116-11 is supplied to the node ND13 through the capacitor C11 and the analog signal VSL2 read to the vertical signal line 116-12 is supplied to the node ND13 through the capacitors C12, C13 and C14, and analog addition using capacitors is performed.

The result of analog addition using capacitors is a weighted average value obtained in accordance with capacitance values to be inputted to the input terminal of the read signal of the comparator 151-1.

Next, the switching signal VADDSW1 is set to the same high level in synchronization with the horizontal synchronization signal HSYNC and the switching signal VADDSW3 is switched to the low level.

At this time, the node ND14 and the node ND17 become conductive and the node ND15 and the node ND17 become non-conductive.

Accordingly, the capacitors C11, C13 and C14 are connected to the vertical signal line 116-11 and the capacitor C12 is connected to the vertical signal line 116-12.

As a result, the analog signal VSL1 read to the vertical signal line 116-11 is supplied to the node ND13 through the capacitors C11, C13 and C14 and the analog signal VSL2 read to the vertical signal line 116-12 is supplied to the node ND13 through the capacitor C12, and analog addition using capacitors is performed.

The result of analog addition using capacitors is a weighted average value obtained in accordance with capacitance values to be inputted to the input terminal of the read signal of the comparator 151-1.

It is not necessary to newly prepare capacitors for analog addition, and capacitors prepared for auto zero or CDS can be used.

The auto zero is a technique in which the output is connected to the input terminal and electric charges for the offset are stored in the capacitor for cancelling the offset of an amplifier used for the comparator 151-1. Additionally, CDS is a technique in which offset noise is cancelled by sampling twice at a reset level and a signal level.

In almost all existing image sensors performing column parallel processing, techniques such as CDC and auto zero are used for removing the difference of characteristics in respective pixels and columns, therefore, addition processing can be realized without increasing the circuit area.

For example, the column input unit 152C of FIG. 16 can be configured as a circuit incorporated with an auto-zero capacitor.

In the circuit, the auto-zero capacitor is divided into four, and switches SW13C to SW15C for allocating the capacitors to the analog signals VSL1 and VSL2. Additionally, the switches SW11C and SW12C for connecting to the vertical signal lines 116-11, 116-12 are included as described above.

As described above, it is possible to reduce power consumption to approximately ½ with respect to existing methods at the time of adding pixels when applying the solid-state imaging device according to the embodiment.

Capacitors used in techniques such as auto-zero and CDS are applied in this method of addition, therefore, it is not necessary to increase the circuit scale as compared with existing configurations. It is also possible to perform addition with arbitrary weighting by switching the capacitance value by switches and so on.

In the present embodiment, data in the read line and the adjacent line are simultaneously selected and A/D converted after added by capacitors before the column processing unit performing A/D conversion. That is, the number of times of A/D conversion is reduced to ½ as compared with the common method, as a result, only the upper part of the column processing unit is used and it is not necessary to use the lower part of the column processing unit.

As a result, low power consumption of circuits can be realized.

3. Second Embodiment

Figure 20:
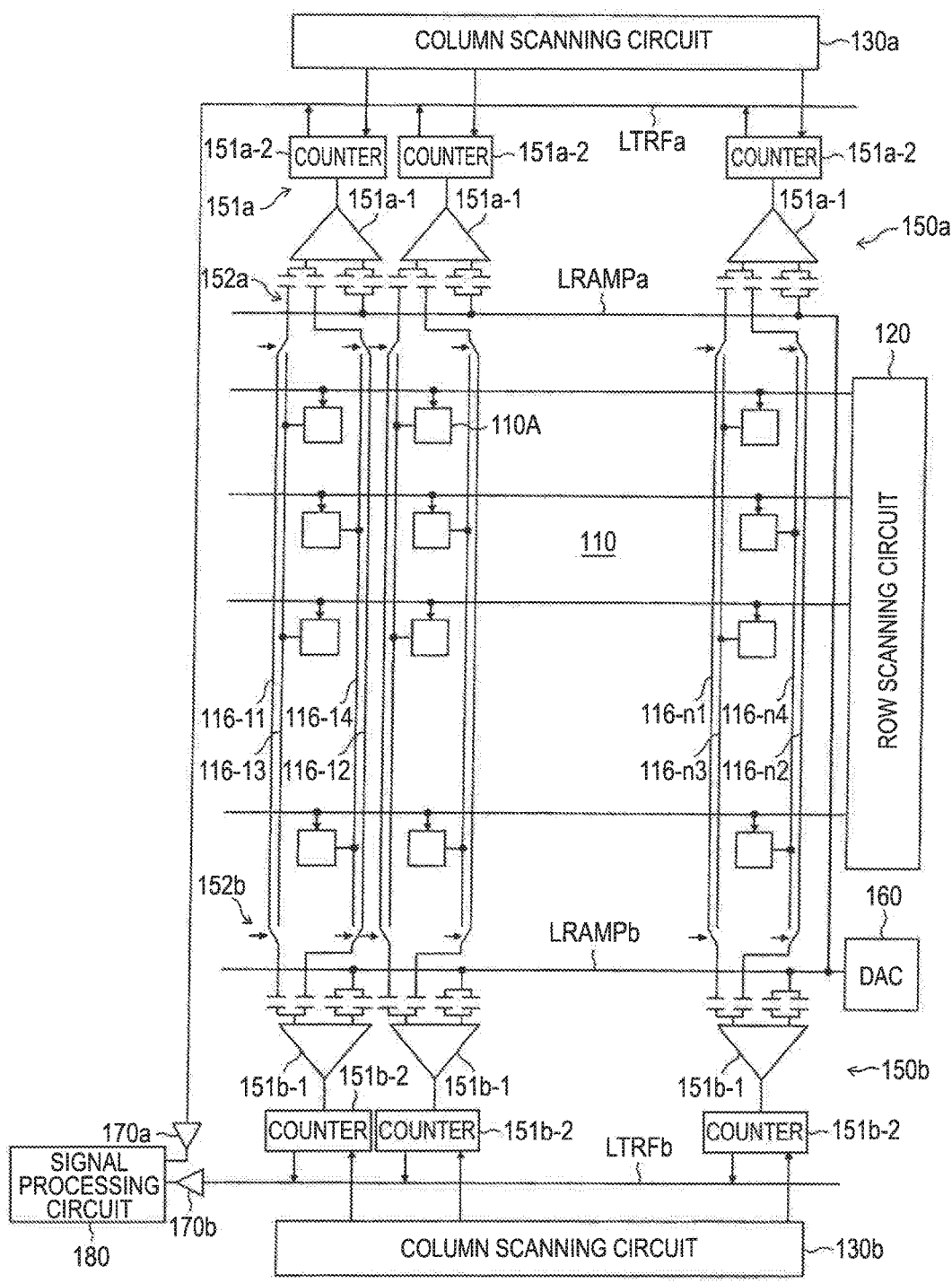
FIG. 20 is a diagram showing a column-parallel ADC mounted solid-state imaging device (CMOS image sensor) according to a second embodiment.

FIG. 20 is a diagram showing a column-parallel ADC mounted solid-state imaging device (CMOS image sensor) according to a second embodiment.

A solid-state imaging device 100A has a configuration in which odd-numbered columns and even-numbered column are read by a-system (first system) and a b-system (second system) which are different systems. In the configuration of FIG. 20, a both-side column structure is applied, in which the first system and the second system are divided to an upper part and a lower part by the pixel array unit 110 sandwiched therebetween.

Generally, data of a certain line is transmitted to a lower column processing unit 150b and data of an adjacent next line is transmitted to an upper column processing unit 150a in a period of read time of one line, when performing addition processing.

Subsequently, data of a next line and a further next line is transmitted to the upper and lower column processing units in a period of read time of the next line.

Then, the addition of read signals is performed by the counter and the signal processing unit. That is, the A/D conversion is performed the same number of times as in the case of reading all pixels even when the output data rate will be finally reduced by addition.

In contrast, in the solid-state imaging device 100A, two pixel signals are transmitted to the upper column processing unit 150a and two pixel signals are also transmitted to the lower column processing unit 150b, and the addition by capacitors is performed respectively, thereby reducing the number of A/D conversion to ½.

In this configuration, it is sufficient to perform A/D conversion for the number of pixels obtained by skipping pixel signals by addition, which can double a frame rate in a state of no addition.

Also in this configuration, it is also possible that the addition by capacitors is performed by transmitting signals of two pixels to the upper column processing unit 150a in a period of read time of one line and that the addition by capacitors is performed by transmitting signals of two pixels also in the next period of read time.

In this case, the frame rate will be the same in the addition processing mode as in the case of reading all pixels, however, it is not necessary to use the column processing unit 150b, therefore, power of the circuit of the column processing unit 150b can be stopped, which can reduce power consumption at the time of addition processing.

The technique can be applied to a solid-state imaging device of pixel sharing, namely, the solid-state imaging device which shares pixels in units of 2×2 and has the FD (floating diffusion).

Hereinafter, characteristic advantages of the embodiment in pixel addition will be explained while being compared with a common method.

In the following explanation, the column processing configuration having the both-side column structure will be explained as a single-side column structure.

Figure 21:
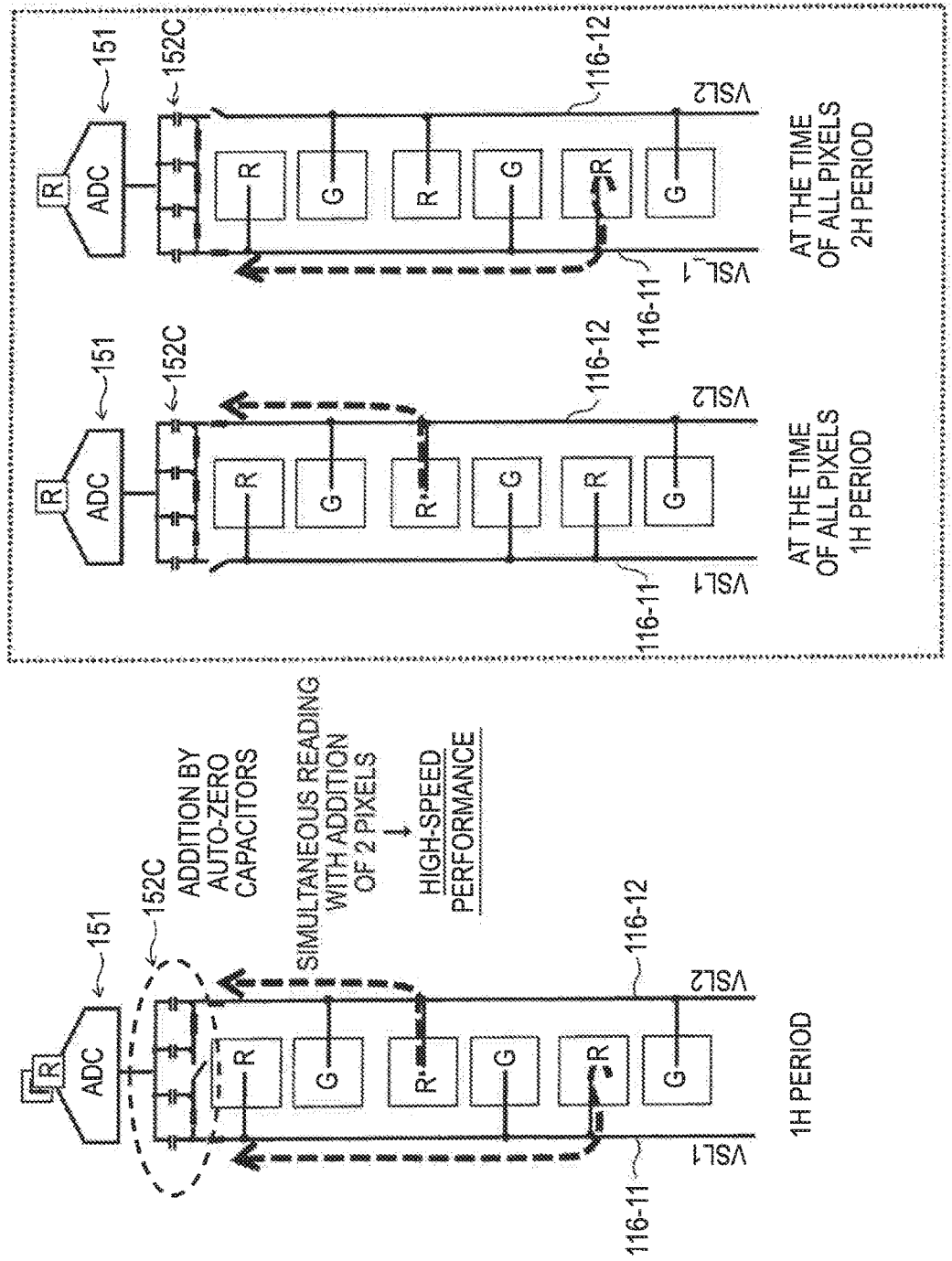
FIG. 21 is a diagram for explaining advantages in a single-side column structure according to the first embodiment.

FIG. 21 is a diagram for explaining advantages in the single-side column structure according to the first embodiment.

Figure 22:
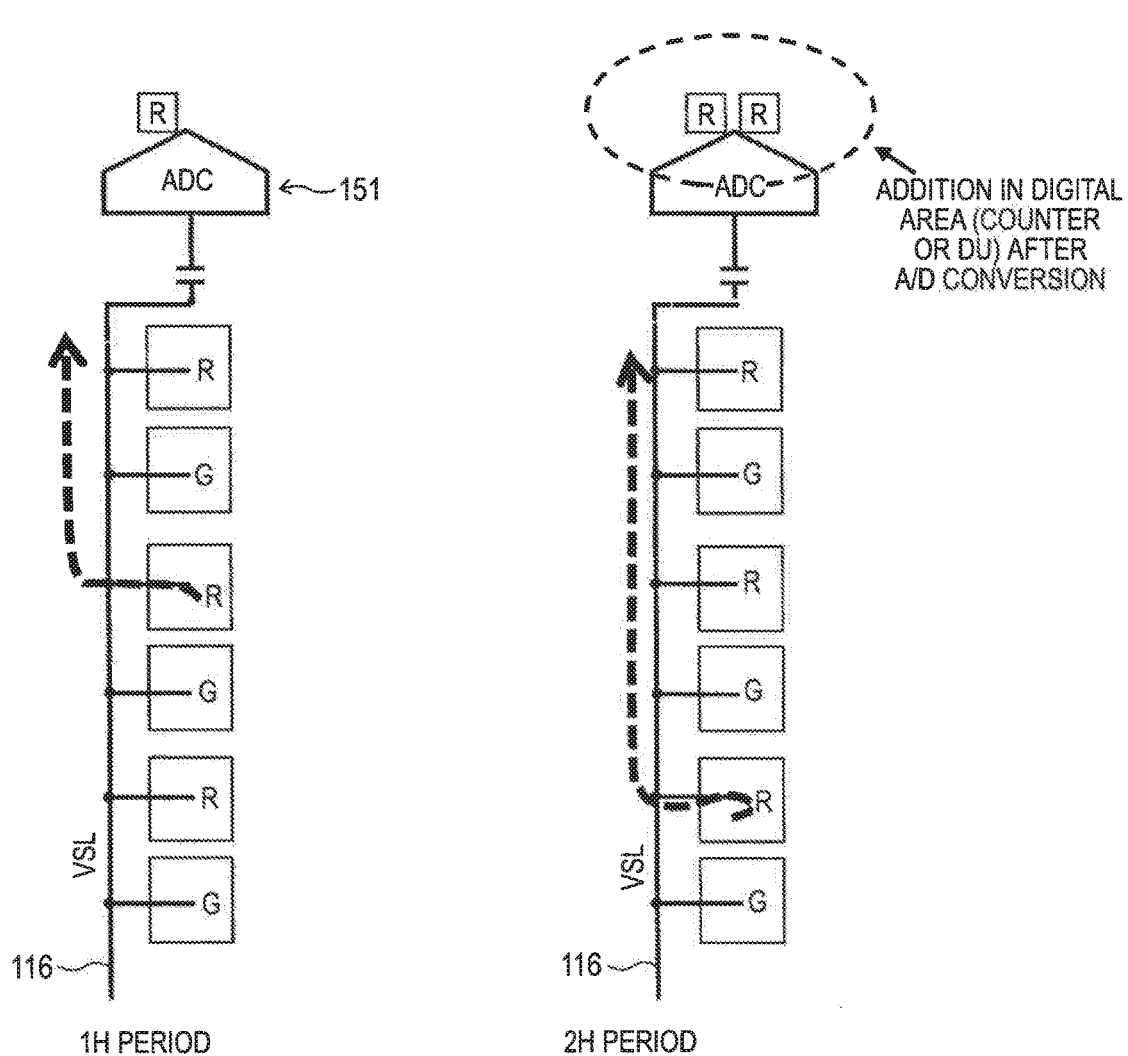
FIG. 22 is a diagram shown as a comparative example of FIG. 21.

FIG. 22 is a diagram shown as a comparative example of FIG. 21.

FIG. 21 schematically shows the example of applying the column input unit of, for example, FIG. 11 or FIG. 16, in which auto-zero capacitors are used as four capacitors of the column input unit 152C.

An R-pixel and a G-pixel in the first column are connected to the vertical signal line 116-11 and another R-pixel and another G-pixel are connected to the vertical signal line 116-12 in the first column.

In contrast, R-pixels and G-pixels in the first column are connected to one vertical signal line 116 in FIG. 22.

In the case of the present embodiment shown in FIG. 21, it is possible that two pixels are simultaneously read in a 1H (horizontal synchronization) period and A/D conversion is performed after the addition using capacitors, which can realize high-speed processing. At the time of reading all pixels, pixels are sequentially read in respective H periods.

In the comparative example of FIG. 22, an R-pixel is read in the 1H period and another R-pixel is read in a 2H period, then, addition is performed in a digital area after A/D conversion, therefore, it is difficult to realize high-speed performance.

Figure 23:
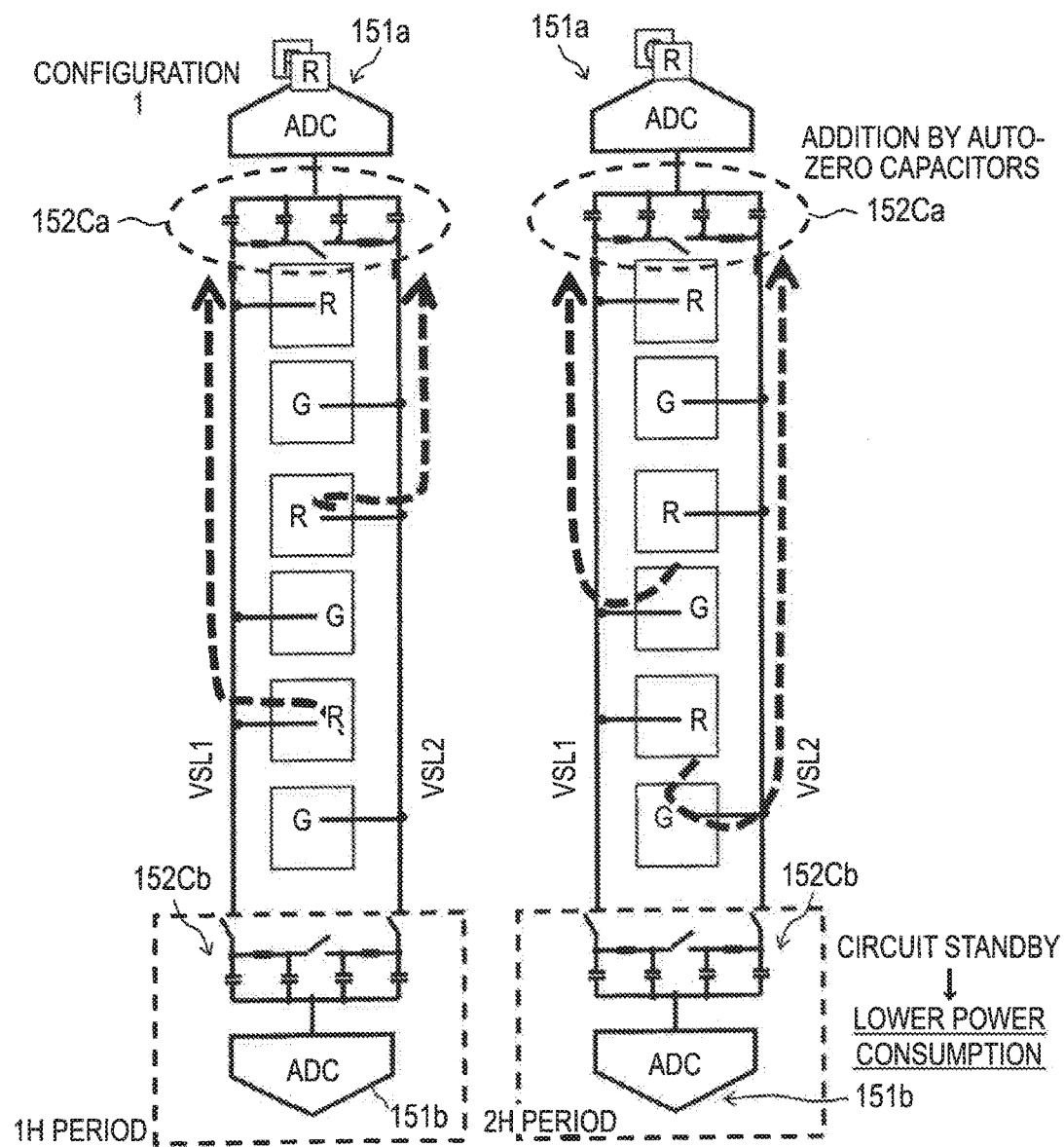
FIG. 23 is a diagram for explaining advantages of a both-side column structure according to the second embodiment.

FIG. 23 is a diagram for explaining advantages of the both-side column structure according to the second embodiment.

Figure 24:
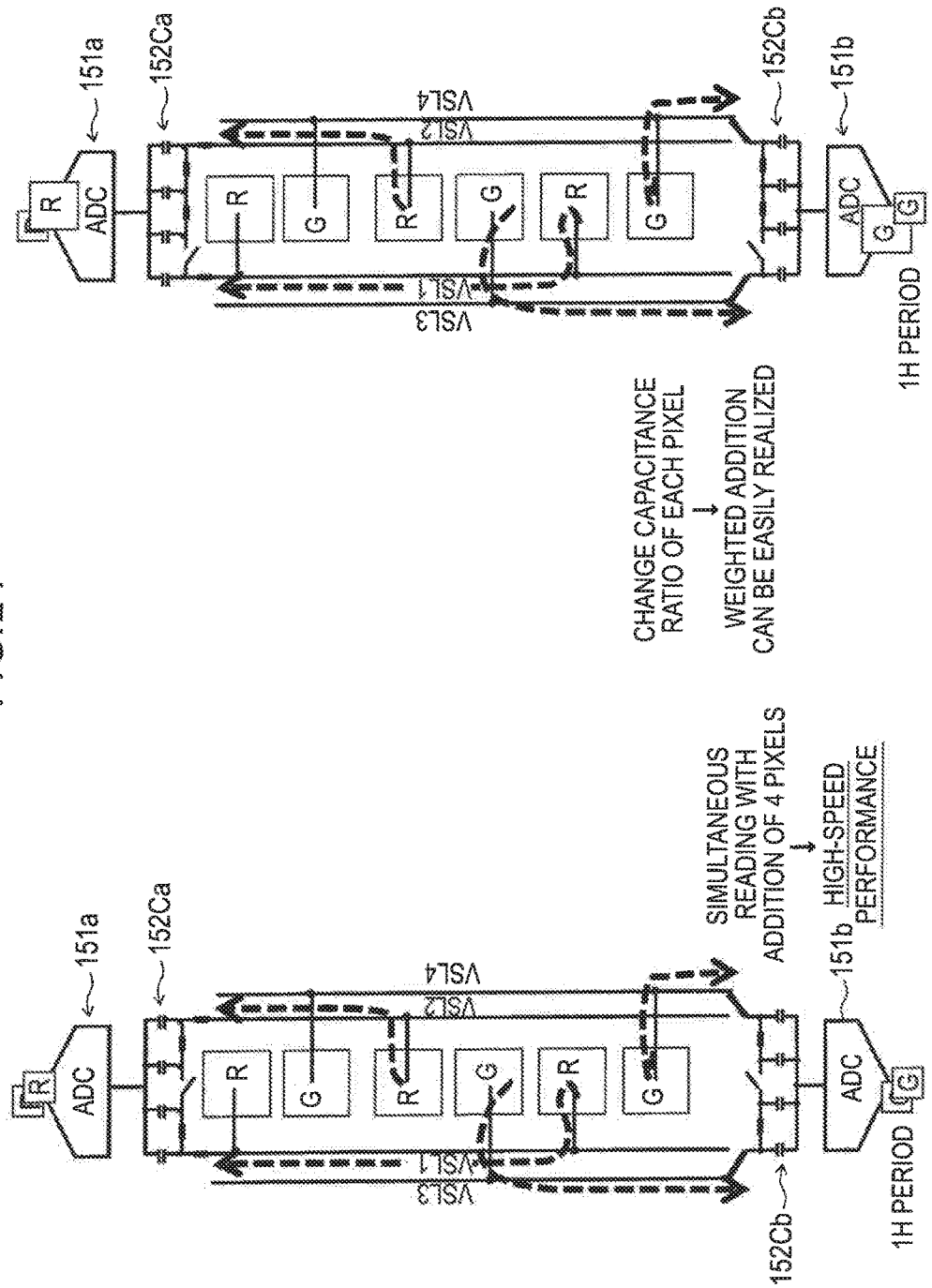
FIG. 24 is a diagram for explaining advantages obtained when four vertical signal lines are wired in each column in the both-side column structure according to the second embodiment.

FIG. 24 is a diagram for explaining advantages obtained when four vertical signal lines are wired in each column in the both-side column structure according to the second embodiment.

Figure 25:
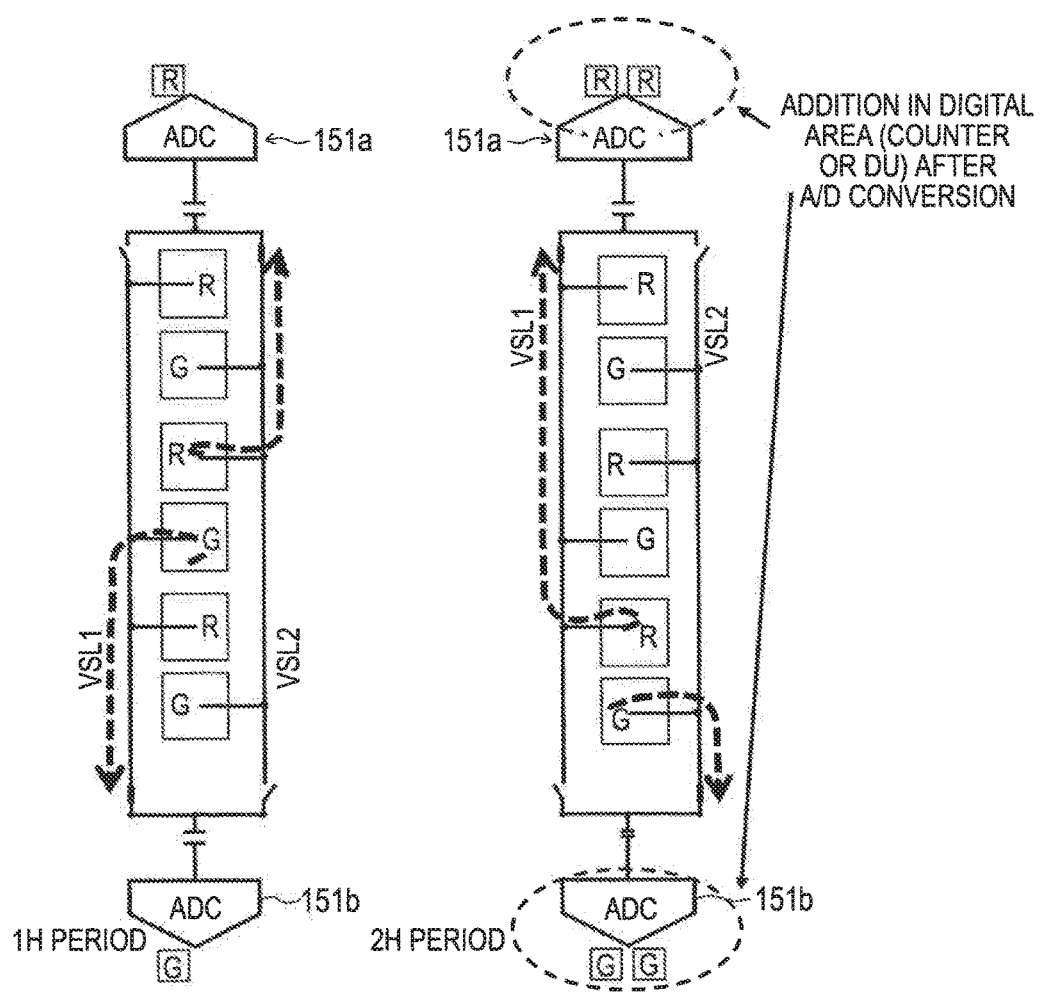
FIG. 25 is a diagram showing as a comparative example of FIG. 23.

FIG. 25 is a diagram showing as a comparative example of FIG. 23.

Also in FIG. 23 and FIG. 24, the example of applying the column input unit shown in, for example, FIG. 11 or FIG. 16 is schematically shown, in which the auto-zero capacitors are used as four capacitors of the column input unit 152C.

In the case of the present embodiment shown in FIG. 23, it is possible that two pixels are simultaneously read in a 1H (horizontal synchronization) period and A/D conversion is performed after the addition using capacitors, which can realize high-speed processing. At the time of reading all pixels, pixels are sequentially read in respective H periods.

In the example of FIG. 23, two R-pixels are simultaneously read to the upper column processing unit 151a in the 1H period and two G-pixels are simultaneously read to the upper column processing unit 151a in the next 2H period.

The lower side column processing unit 151b is in a circuit standby state and can reduce power consumption.

In the example of FIG. 24, four vertical signal lines 116-11, 116-12, 116-13 and 116-14 are wired.

In this case, two R-pixels can be simultaneously read to the upper column processing unit 151a by the vertical signal lines 116-11 and 116-12, and two G-pixels can be simultaneously read to the lower column processing unit 151b by the vertical signal lines 116-13 and 116-14. That is, reading with addition of four pixels at the same time can be realized in the example of FIG. 24, which realizes high-speed processing.

In the comparative example of FIG. 25, an R-pixel is read to the upper column processing unit 151a and a G-pixel is read to the lower column processing unit 151b in the 1H period. Next, another R-pixel is read to the upper column processing unit 151a and another G-pixel is read to the lower column processing unit 151b in the 2H period.

Then, the addition is performed in the digital area after A/D conversion, therefore, it is difficult to perform high-speed processing.

Figure 26:
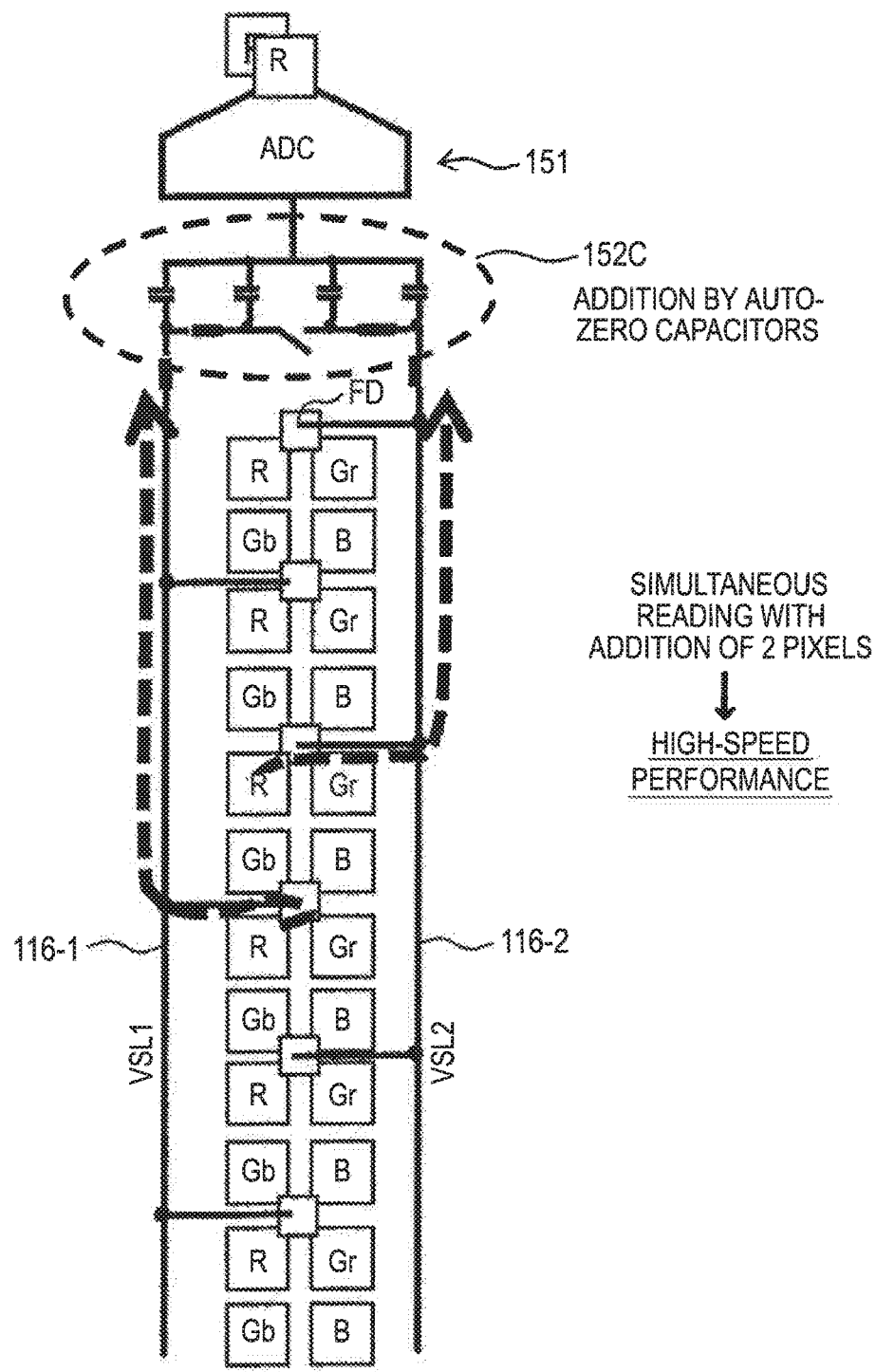
FIG. 26 is a diagram for explaining advantages in pixel sharing of 2×2 in the single-side column structure according to the embodiment.

FIG. 26 is a diagram for explaining advantages in pixel sharing of 2×2 in the single-side column structure according to the embodiment.

Figure 27:
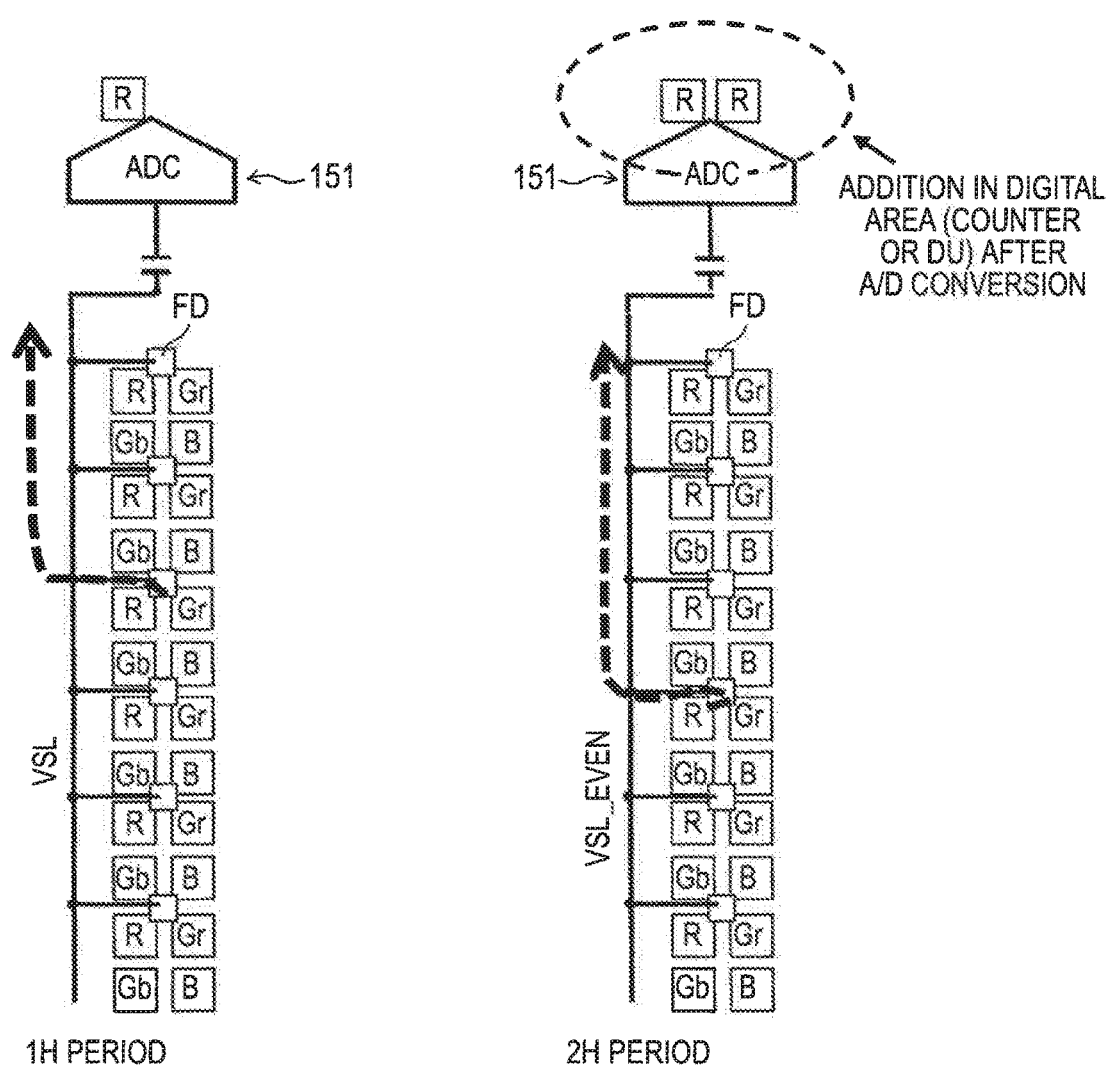
FIG. 27 is a diagram shown as a comparative example of FIG. 26.

FIG. 27 is a diagram shown as a comparative example of FIG. 26.

FIG. 26 schematically shows the example of applying the column input unit of, for example, FIG. 11 or FIG. 16, in which auto-zero capacitors are used as four capacitors of the column input unit 152C.

In the first column, shared pixels of R, Gr, Gb and B of given rows are connected to the vertical signal line 116-11 and shared pixels of another rows are connected to the vertical signal line 116-12.

In contrast, shared pixels of R, Gr, Gb and B of the first column are connected to one vertical signal line 116 in FIG. 27.

In the example of FIG. 26, it is possible to simultaneously read two-pixels in the 1H (horizontal synchronization) period and to perform A/D conversion after performing addition using capacitors, which realizes high-speed processing.

In the comparative example of FIG. 27, the shared pixels are read in the 1H period and another shared pixels are read in the 2H period, then, addition is performed in the digital area after A/D conversion, therefore, it is difficult to realize high-speed processing.

Figure 28:
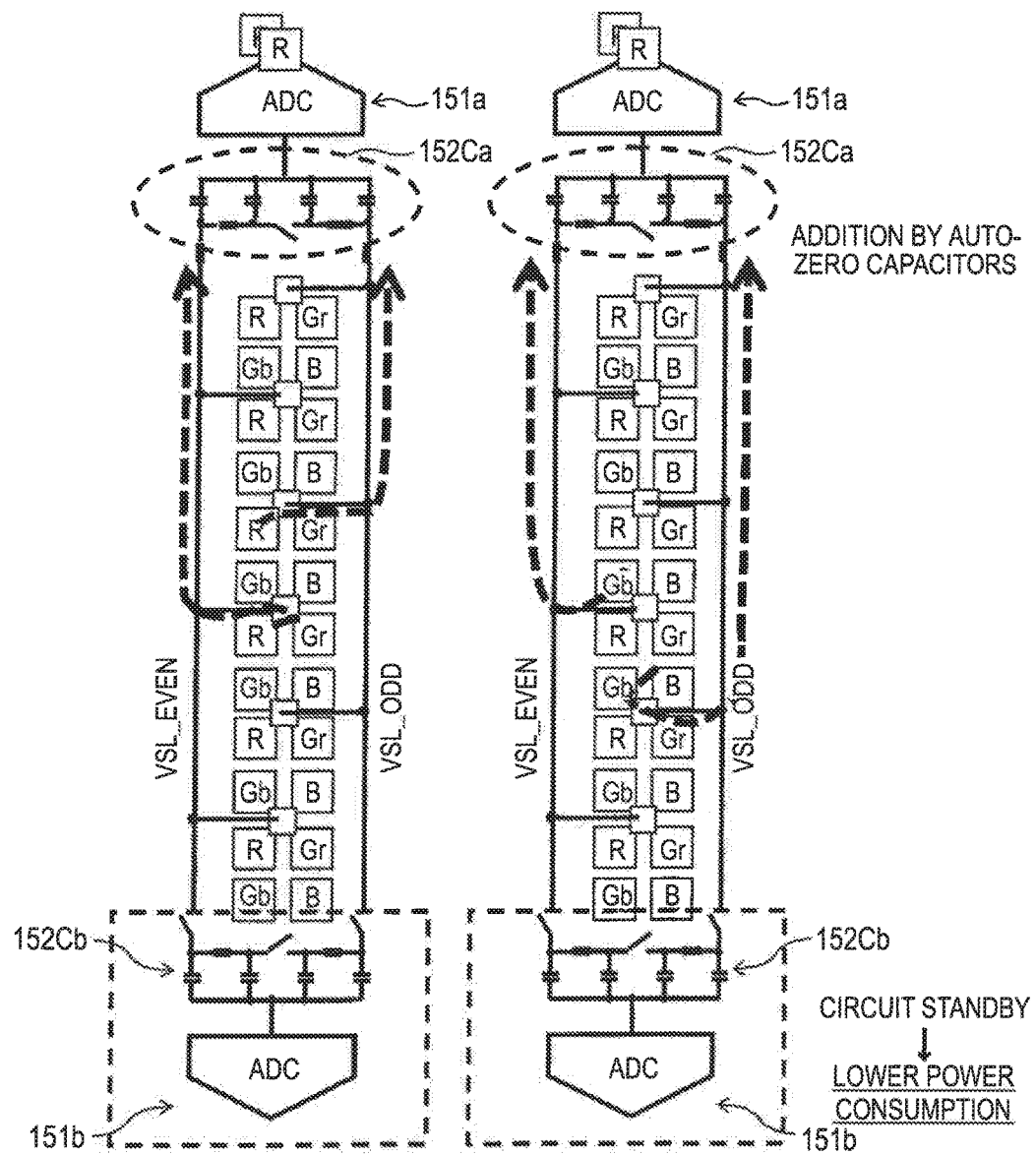
FIG. 28 is a first diagram for explaining advantages in pixel sharing of 2×2 in the both-side column structure according to the second embodiment.

FIG. 28 is a first diagram for explaining advantages in pixel sharing of 2×2 in the both-side column structure according to the second embodiment.

Figure 29:
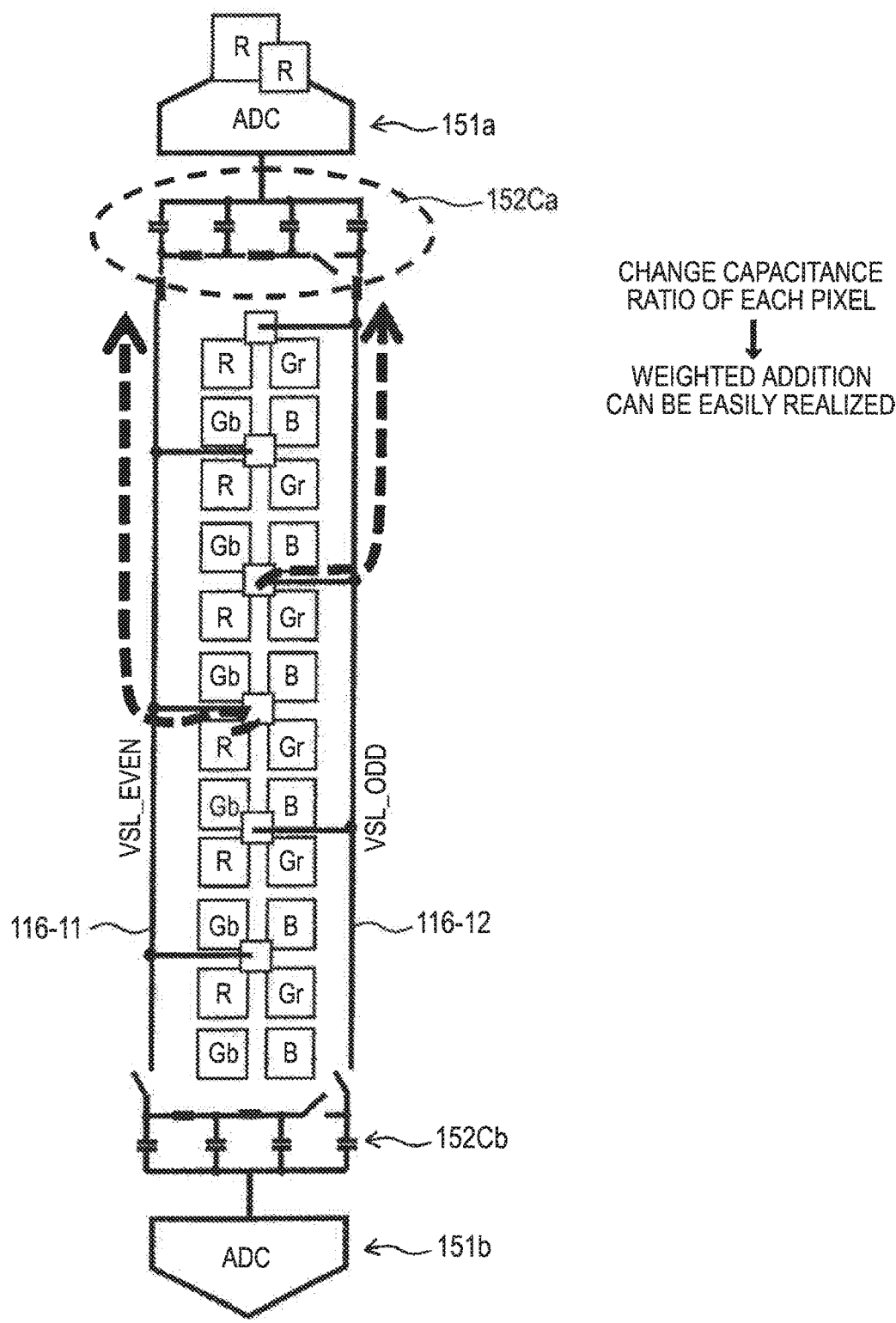
FIG. 29 is a second diagram for explaining advantages in pixel sharing of 2×2 in the both-side column structure according to the second embodiment.

FIG. 29 is a second diagram for explaining advantages in pixel sharing of 2×2 in the both-side column structure according to the second embodiment.

Figure 30:
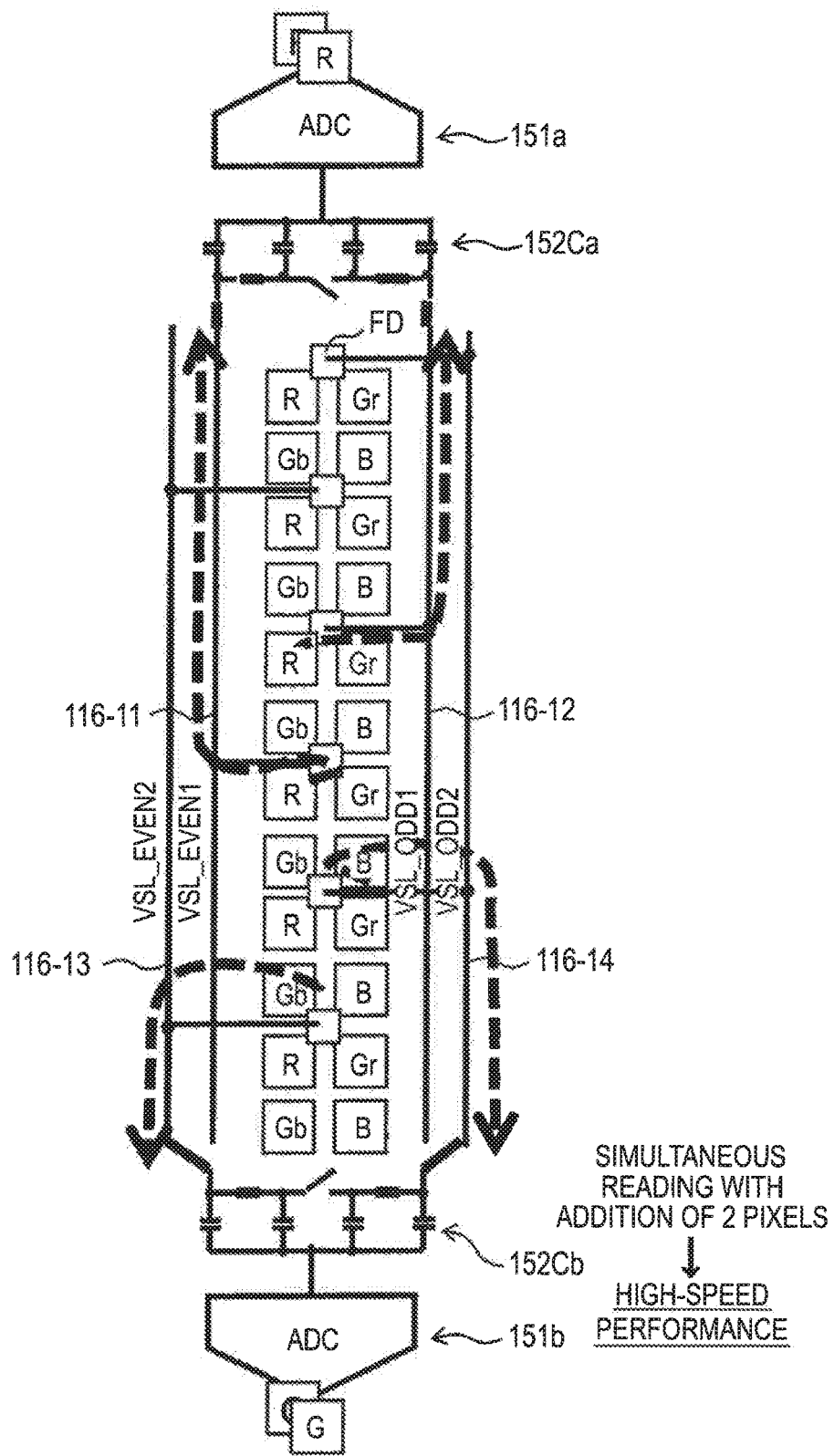
FIG. 30 is a diagram for explaining advantages obtained when four vertical signal lines are wired in each column in pixel sharing of 2×2 in the both-side column structure according to the second embodiment.

FIG. 30 is a diagram for explaining advantages obtained when four vertical signal lines are wired in each column in pixel sharing of 2×2 in the both-side column structure according to the second embodiment.

Figure 31:
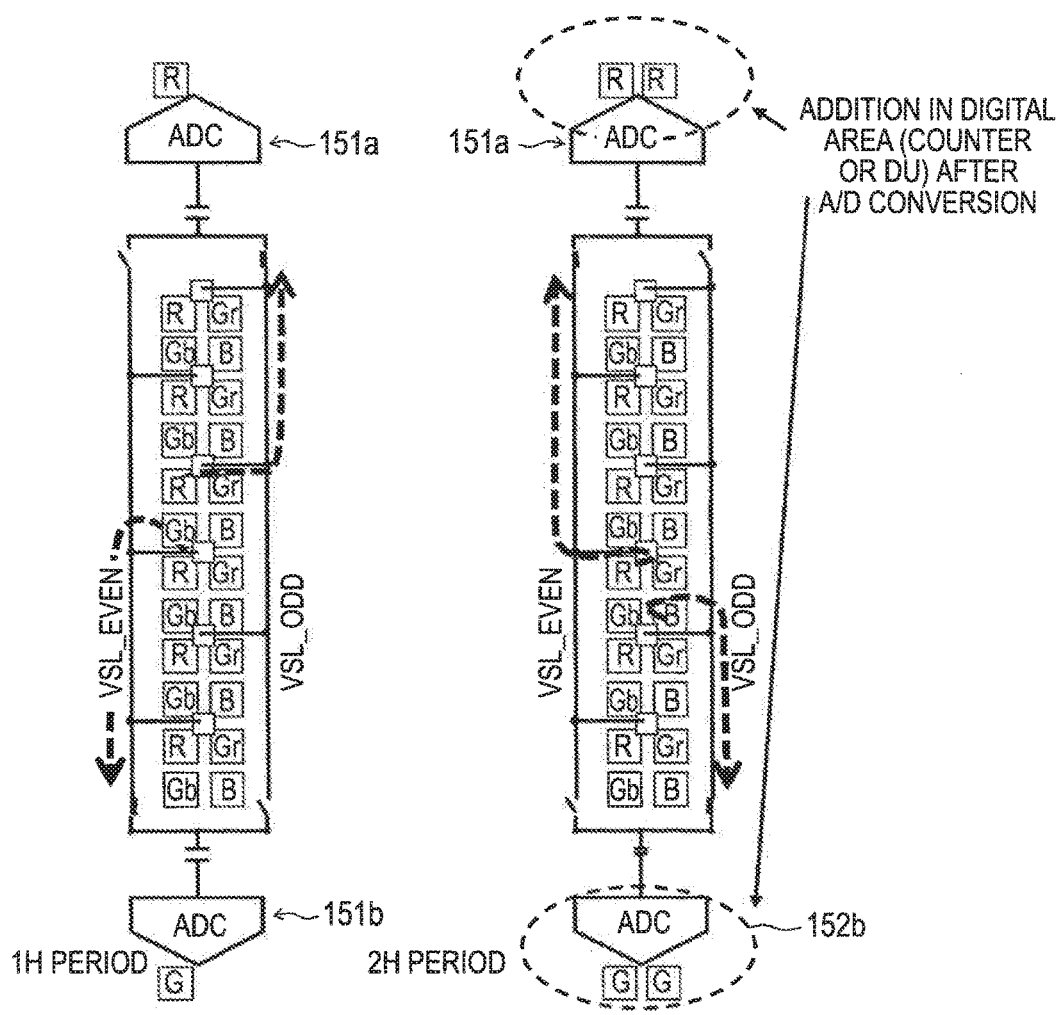
FIG. 31 is a diagram shown as a comparative example of FIG. 28.

FIG. 31 is a diagram shown as a comparative example of FIG. 28.

FIG. 28 to FIG. 30 also schematically show examples of applying the column input unit of, for example, FIG. 11 or FIG. 16, in which auto-zero capacitors are used as four capacitors of the column input unit 152C.

In the example of FIG. 28, it is possible to simultaneously read two-pixels in the 1H (horizontal synchronization) period and to perform A/D conversion after performing addition using capacitors, which realizes high-speed processing. At the time of reading all pixels, pixels are sequentially read in respective H periods.

In examples of FIG. 28 and FIG. 29, two R-pixels are simultaneously read to the upper column processing unit 151a in the 1H period and two G-pixels are simultaneously read to the upper column processing unit 151a in the next 2H period.

As the lower column processing unit 151b is in the circuit standby state, low power consumption can be realized.

In the example of FIG. 29, weighted addition can be easily realized by changing the capacitance ratio of each pixel.

In the example of FIG. 30, four vertical signal lines 116-11, 116-12, 116-13 and 116-14 are wired.

In this case, two R-pixels can be simultaneously read to the upper column processing unit 151a by the vertical signal lines 116-11 and 116-12, and two G-pixels can be simultaneously read to the lower column processing unit 151b by the vertical signal lines 116-13 and 116-14. That is, simultaneous reading with addition of four pixels can be realized, which can realize high-speed processing.

In the comparative example of FIG. 31, an R-pixel is read to the upper column processing unit 151a and a G-pixel is read to the lower column processing unit 151b in the 1H period. Next, another R-pixel is read to the upper column processing unit 151a and another G-pixel is read to the lower column processing unit 151b in the 2H period.

Then, the addition is performed in the digital area after A/D conversion, therefore, it is difficult to perform high-speed processing.

Figure 32:
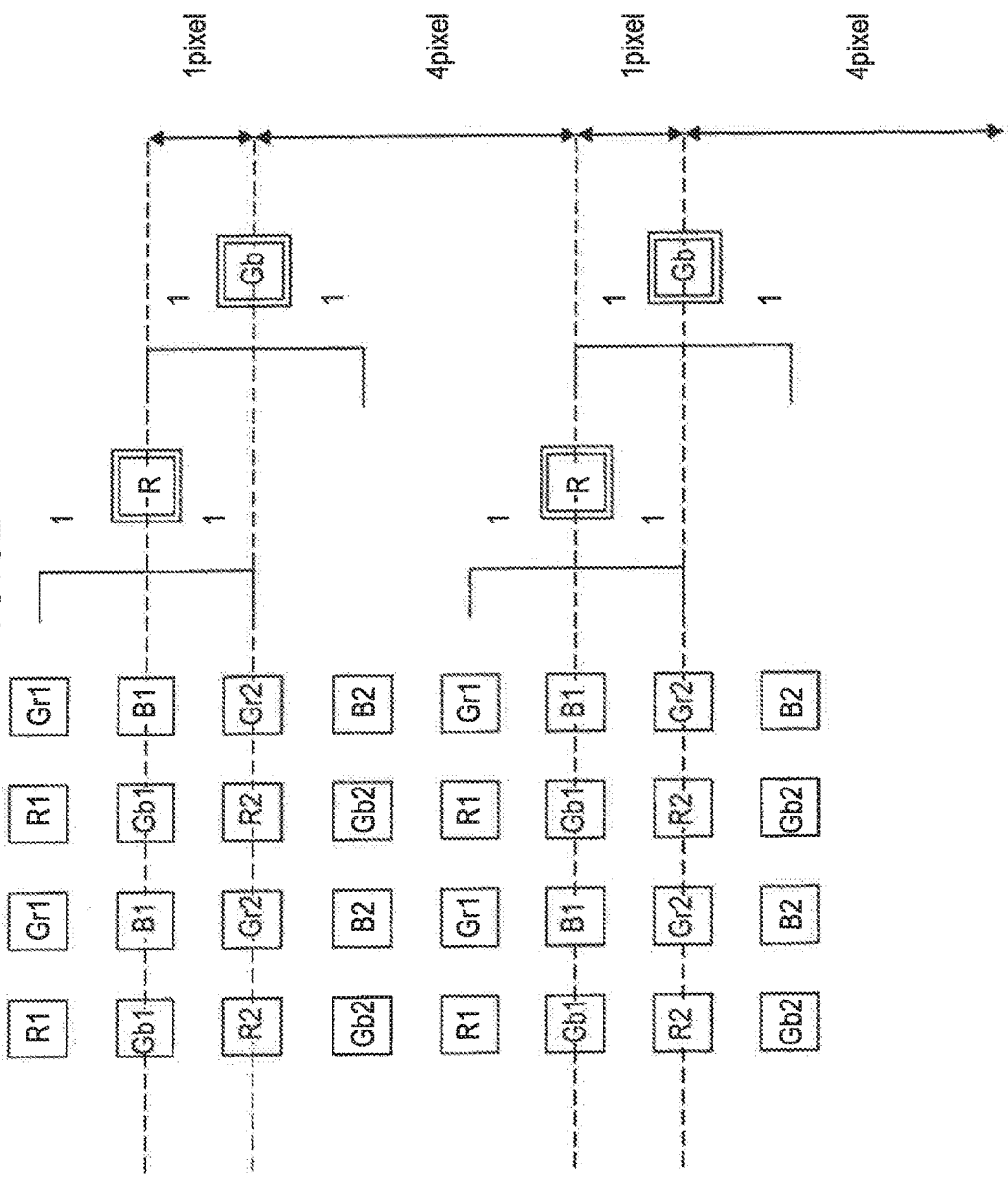
FIG. 32 is a first diagram schematically showing the concept of weighting at the time of addition with weighting.

FIG. 32 is a first diagram schematically showing the concept of weighting at the time of addition with weighting.

Figure 33:
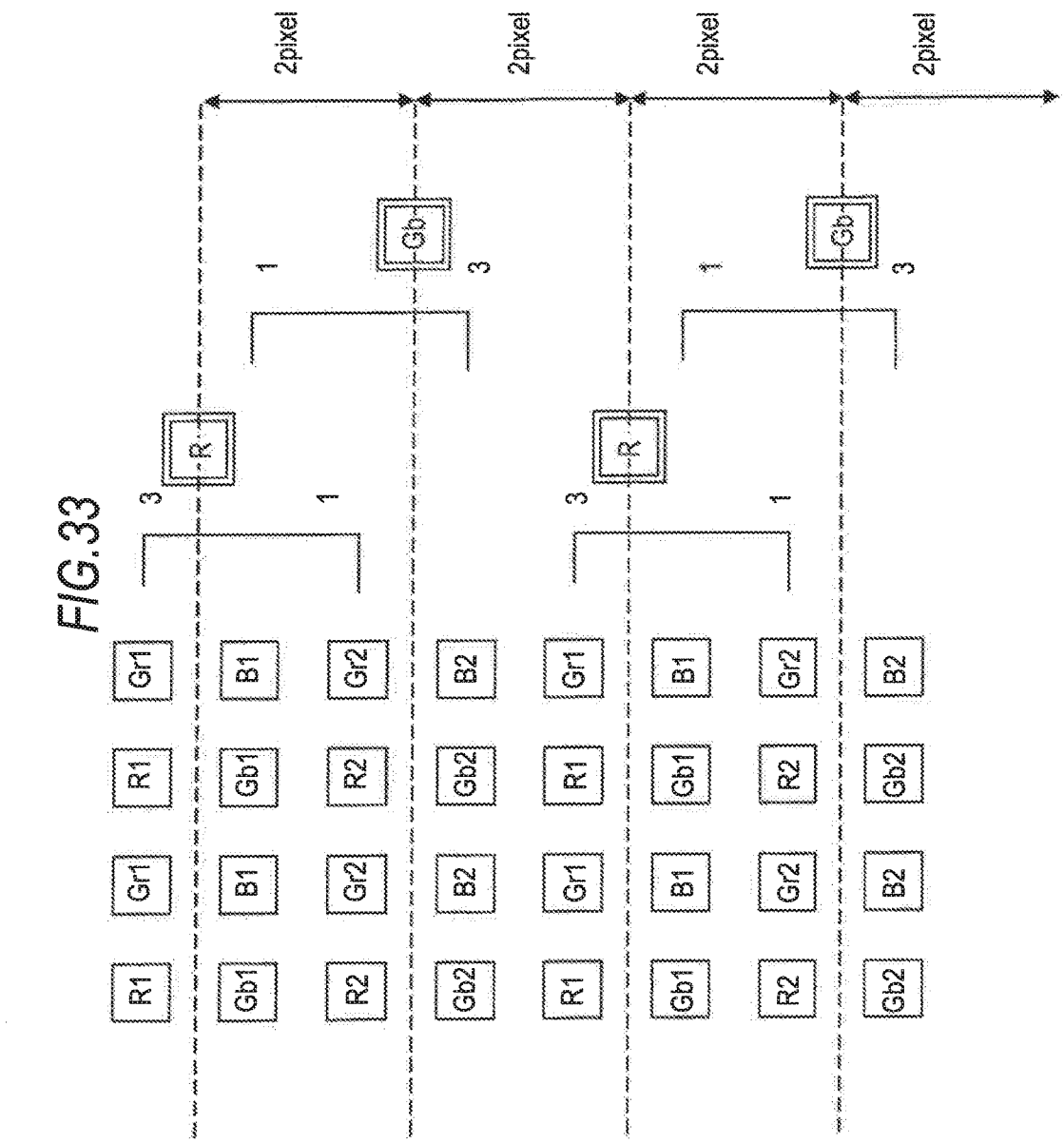
FIG. 33 is a second diagram schematically showing the concept of weighting at the time of addition with weighting.

FIG. 33 is a second diagram schematically showing the concept of weighting at the time of addition with weighting.

As shown in FIG. 32 and FIG. 33, when the difference of skipping amounts (the number of rows) of respective pixels to be read are not uniform at the time of reading with addition, it is necessary to adjust the centroid by addition with weighting.

The adjustment is necessary in the example shown in FIG. 30.

As described above, the following advantages can be obtained by the solid-state imaging device according to the embodiment.

According to the embodiment, it is possible to reduce power consumption to approximately ½ as compared with existing methods at the time of performing pixel addition. It is also possible to perform reading at approximately double speed.

As capacitors used in the auto-zero technique or the CDS technique can be utilized in the addition method, it is not necessary to increase the circuit scale as compared with existing methods. It is also possible to perform addition with arbitrary weighting by switching the capacitance value by the switch and so on.

The solid-state imaging device having the above advantages can be applied to imaging devices of a digital camera, a video camera and so on.

4. Third Embodiment (Configuration Example of a Camera System)

Figure 34:
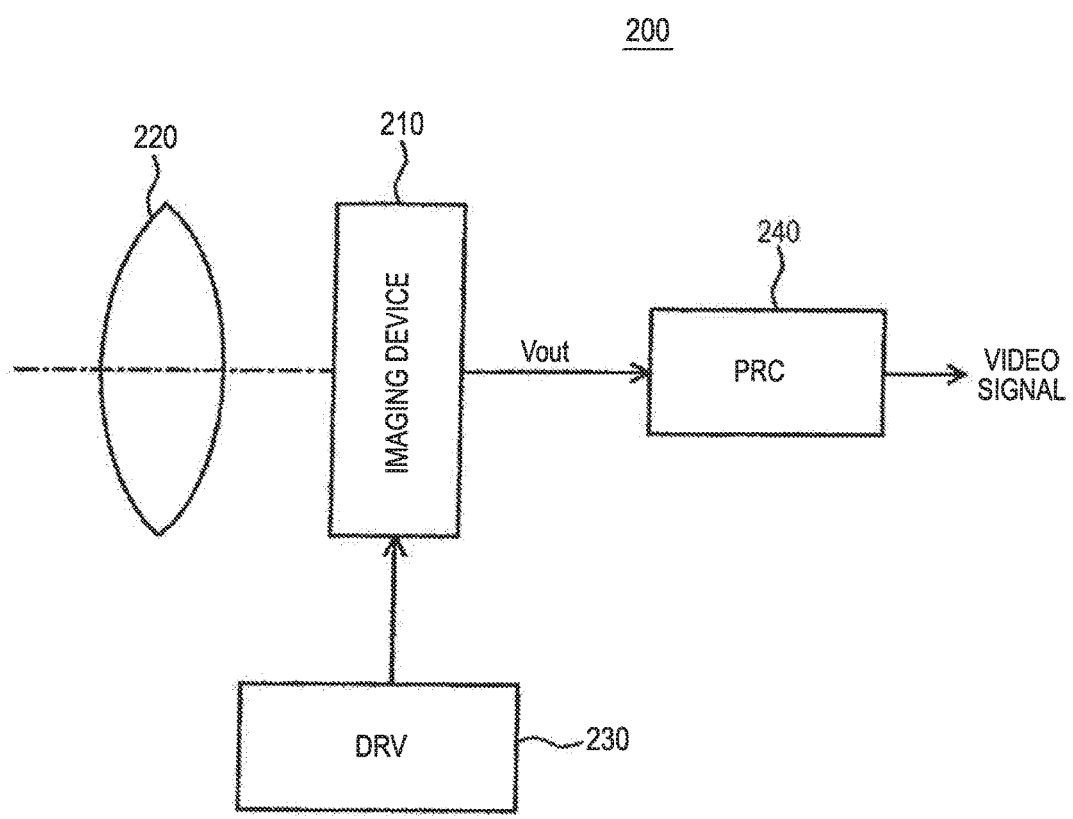
FIG. 34 is a view showing a configuration example of a camera system to which the solid-state imaging device is applied according to a third embodiment.

FIG. 34 is a view showing a configuration example of a camera system to which the solid-state imaging device is applied according to a third embodiment.

A camera system 200 includes an imaging device 210 to which the solid-state imaging devices 100/100A according to the embodiment can be applied as shown in FIG. 34.

The camera system 200 includes, for example, a lens 220 forming an image of incident light (image light) on an imaging surface as an optical system introducing incident light (forming an object image) into a pixel area of the imaging device 210.

The camera system 200 further includes a drive circuit (DRV) 230 driving the imaging device 210 and a signal processing circuit (PRC) 240 processing output signals of the imaging device 210.

The drive circuit 230 includes a timing generator (not shown) generating various timing signals including a start pulse and a clock pulse for driving circuits in the imaging device 210, which drives the imaging device 210 by given timing signals.

The signal processing circuit 240 performs given signal processing to output signals of the imaging device 210.

Image signals processed in the signal processing circuit 240 are recorded in a recording medium such as a memory. The image information recorded in the recording medium is hard copied by a printer and so on. The pixel signals processed in the signal processing circuit 240 are displayed on a monitor formed by a liquid crystal display or the like as moving pictures.

As described above, it is possible to realize a camera having high-speed and highly accurate performance by mounting the solid-state imaging device 100/100A as the imaging device 210 on an imaging apparatus such as a digital still camera.

The present disclosure may be implemented as the following configurations.

(1) A solid-state imaging device including
a pixel array unit in which unit pixels each having a photoelectric conversion device are arranged in a matrix state, plural column signal lines are wired with respect to one column in the pixel arrangement and pixels are regularly connected to the plural column signal lines in accordance with rows in which pixels are positioned,
a pixel signal reading unit having a column processing unit reading pixel signals in units of plural pixels from the pixel array unit and performing column processing to read signals on a column basis,
in which the pixel signal reading unit includes a column input unit which can connect one or plural column signal lines arranged at a corresponding column to an input of one column processing unit through plural capacitors connected in parallel, and
the column input unit has switches which can change a connection state between plural capacitors and plural column signal lines corresponding to the column.

(2) The solid-state imaging device described in the above (1),
in which the plural capacitors of the column input unit add analog signals transferred through one or plural column signal lines and supply the signals to the column processing unit.

(3) The solid-state imaging device described in the above (1) or (2),
in which the column input unit can change capacitance values of the capacitors by changing the number of capacitors connected to the column signal lines by switches.

(4) The solid-state imaging device described in the above (2),
in which the column input unit can perform weighting of pixel signals to be added by changing the number of capacitors connected to the column signal lines by switches.

(5) The solid-state imaging device described in any one of the above (1) to (4),
in which the column processing unit includes
capacitors at an input stage and
the column input unit uses the capacitors at the input stage of the column processing unit in common as plural capacitors.

(6) The solid-state imaging device described in any one of the above (1) to (5),
in which the column processing unit includes
a comparator comparing a reference signal as a ramp wave with a potential of a read signal of a column, and
a counter latch arranged so as to correspond to the comparator, capable of counting comparison time of the corresponding comparator, stopping counting when an output of the comparator is inverted and holding a count value, and
the column input unit includes
plural first capacitors connected in parallel to an input terminal of the read signal of the comparator,
switches capable of switching the connection state between the plural first capacitors and the plural column signal lines of a corresponding column and
plural second capacitors connected in parallel between an input terminal of the reference signal of the comparator and a supply line of the reference signal.

(7) The solid-state imaging device described in the above (6),
in which the number of the plural first capacitor is same as the number of the plural second capacitor.

(8) A camera system including
a solid-state imaging device, and
an optical system forming an object image on the solid-state imaging device,
in which the solid-state imaging device includes
a pixel array unit in which unit pixels each having a photoelectric conversion device are arranged in a matrix state, plural column signal lines are wired with respect to one column in the pixel arrangement and pixels are regularly connected to the plural column signal lines in accordance with rows in which pixels are positioned, and
a pixel signal reading unit having a column processing unit reading pixel signals in units of plural pixels from the pixel array unit and performing column processing to read signals on a column basis,
in which the pixel signal reading unit includes a column input unit which can connect one or plural column signal lines arranged at a corresponding column to an input of one column processing unit through plural capacitors connected in parallel, and
the column input unit has switches which can change a connection state between plural capacitors and plural column signal lines corresponding to the column.

It should be understood by those skilled in the art that various modifications, combinations, sub-combinations and alterations may occur depending on design requirements and other factors insofar as they are within the scope of the appended claims or the equivalents thereof.

What is claimed is:
1. A camera system, comprising:
an imaging device; and
an optical system configured to form an object image on the imaging device, wherein the imaging device includes:
a pixel array circuit comprising a first pixel and a second pixel;
a first switch coupled to the first pixel via a first column signal line;
a first capacitor coupled to the first switch;
a second switch coupled to the second pixel via a second column signal line;
a second capacitor coupled to the second switch;
a reference signal generator configured to generate a reference signal; and
a comparator configured to compare the reference signal with a first pixel signal transmitted via the first column signal line;
wherein the imaging device further includes at least one of (i) a third switch coupled to the first pixel and the second capacitor and (ii) a fourth switch coupled to the second pixel and the first capacitor;
wherein a first input terminal of the comparator is coupled to at least one of the first capacitor and the second capacitor, and
wherein a second input terminal of the comparator is coupled to the reference signal generator via a third capacitor.
2. The camera system according to claim 1,
wherein the imaging device includes the third switch and the fourth switch.
3. The camera system according to claim 2,
wherein the first switch, the second switch, the third switch, and the fourth switch are configured to selectively turn on or off based on the first pixel and the second pixel of the pixel array circuit being read.

4. The camera system according to claim 3,
wherein based on the first pixel and the second pixel of the pixel array circuit being read, a level of a first switching signal and a level of a second switching signal are synchronized with a level of a horizontal synchronization signal,
wherein the first switch and the fourth switch are configured to selectively turn on or off based on the level of the first switching signal, and
wherein the second switch and the third switch are configured to selectively turn on or off based on the level of the second switching signal.

5. The camera system according to claim 2,
wherein the first switch, the second switch, the third switch, and the fourth switch are configured to selectively turn on or off based on the first pixel and the second pixel of the pixel array circuit being read using pixel addition.

6. The camera system according to claim 5,
wherein based on the first pixel and the second pixel of the pixel array circuit being read using the pixel addition, a level of a first switching signal is set to high and a level of a second switching signal is set to low,
wherein the first switching signal and the second switching signal are synchronized with a horizontal synchronization signal,
wherein the first switch and the fourth switch are configured to selectively turn on or off based on the level of the first switching signal, and
wherein the second switch and the third switch are configured to selectively turn on or off based on the level of the second switching signal.

7. The camera system according to claim 1,
wherein the first switch and the fourth switch are configured to selectively turn on or off based on a first switching signal, and
wherein the second switch and the third switch are configured to selectively turn on or off based on a second switching signal.

8. The camera system according to claim 7,
wherein the first switch is configured to turn on based on a high level of the first switching signal, and
wherein the fourth switch is configured to turn on based on a low level of the first switching signal.

9. The camera system according to claim 7,
wherein the second switch is configured to turn on based on a high level of the second switching signal, and
wherein the third switch is configured to turn on based on a low level of the second switching signal.

10. The camera system according to claim 1, further comprising:
a counter coupled to an output terminal of the comparator, wherein the counter is configured to count a comparison time of the comparator.

11. The camera system according to claim 1, wherein the first column signal line is adjacent to the second column signal line.

12. The camera system according to claim 2, wherein each of the first switch, the second switch, the third switch, and the fourth switch comprises a p-channel transistor and a n-channel transistor.

13. The camera system according to claim 1,
wherein the first pixel comprises a first plurality of shared pixels, and wherein the second pixel comprises a second plurality of shared pixels.

14. An imaging device, comprising:
a pixel array circuit comprising a first pixel and a second pixel;
a first switch coupled to the first pixel via a first column signal line;
a first capacitor coupled to the first switch;
a second switch coupled to the second pixel via a second column signal line;
a second capacitor coupled to the second switch;
a reference signal generator configured to generate a reference signal; and
a comparator configured to compare the reference signal with a first pixel signal transmitted via the first column signal line;
wherein the imaging device further includes at least one of (i) a third switch coupled to the first pixel and the second capacitor and (ii) a fourth switch coupled to the second pixel and the first capacitor;
wherein a first input terminal of the comparator is coupled to at least one of the first capacitor and the second capacitor, and
wherein a second input terminal of the comparator is coupled to the reference signal generator via a third capacitor.

15. The imaging device according to claim 14,
wherein the imaging device includes the third switch and the fourth switch.

16. The imaging device according to claim 14, further comprising:
a counter coupled to an output terminal of the comparator, wherein the counter is configured to count a comparison time of the comparator.

17. The imaging device according to claim 14,
wherein the first column signal line is adjacent to the second column signal line.

18. The imaging device according to claim 14,
wherein each of the first switch and the second switch comprises a p-channel transistor and a n-channel transistor.

19. The imaging device according to claim 15,
wherein each of the first switch, the second switch, the third switch, and the fourth switch comprises a p-channel transistor and an n-channel transistor.

20. The imaging device according to claim 14,
wherein the first pixel comprises a first plurality of shared pixels, and wherein the second pixel comprises a second plurality of shared pixels.

* * * * *